United States Patent
Yamane et al.

(10) Patent No.: US 7,593,424 B2
(45) Date of Patent: Sep. 22, 2009

(54) TRANSMITTING/RECEIVING SYSTEM, TRANSMITTING APPARATUS, TRANSMITTING METHOD, RECEIVING APPARATUS, RECEIVING METHOD, RECORDING MEDIUM, AND PROGRAM

(75) Inventors: Kenji Yamane, Tokyo (JP); Satoshi Futenma, Tokyo (JP); Hiroshi Kyusojin, Tokyo (JP)

(73) Assignee: Sony Corporation, Tokyo (JP)

(*) Notice: Subject to any disclaimer, the term of this patent is extended or adjusted under 35 U.S.C. 154(b) by 824 days.

(21) Appl. No.: 10/504,483

(22) PCT Filed: Oct. 6, 2003

(86) PCT No.: PCT/JP03/12757

§ 371 (c)(1),
(2), (4) Date: Aug. 12, 2004

(87) PCT Pub. No.: WO2004/054266

PCT Pub. Date: Jun. 24, 2004

(65) Prior Publication Data

US 2005/0105557 A1    May 19, 2005

(30) Foreign Application Priority Data

Dec. 11, 2002    (JP)    ............................. 2002-358945

(51) Int. Cl.
*H04J 3/00* (2006.01)
(52) U.S. Cl. ...................................................... 370/464
(58) Field of Classification Search .................. 370/464; 375/240.1, 240.27
See application file for complete search history.

(56) References Cited

U.S. PATENT DOCUMENTS 5,148,272 A * 9/1992 Acampora et al. ....... 375/240.1

(Continued)

FOREIGN PATENT DOCUMENTS

EP    1311125    5/2003

(Continued)

OTHER PUBLICATIONS

Edwards, E. et al., RTP Payload Format for JPEG 2000 Video Streams, [Online], Internet Draft, [Retrieved on Dec. 22, 2003], Retrieved from the Internet: <URL:http://www.ietf.org/proceedings/03mar/I-D/draft-ietf-avt-rtp-jpeg2000-02.txt> Nov. 4, 2002.

(Continued)

*Primary Examiner*—Kevin C Harper
*Assistant Examiner*—Leon Andrews
(74) *Attorney, Agent, or Firm*—Oblon, Spivak, McClelland, Maier & Neustadt, L.L.P.

(57) ABSTRACT

A transmission and reception system includes a transmission apparatus for transmitting content and a reception apparatus for receiving the content. The transmission apparatus includes a coding section that codes the content into hierarchy codes and outputs coded data of a plurality of layers, a packet generation section that generates packets including the coded data and a timestamp and outputs packets from low-level information of the coded data, and a transmission section that transmits the packets. The reception system includes a reception section that receives the packets, a holding section that holds the packets, a writing control section that controls the writing of the packets, and a determination section that determines whether there is packet loss in the packets. When there is packet loss, the writing control section writes the packets received up to a time of packet loss based on a timestamp in the packets.

13 Claims, 20 Drawing Sheets

U.S. PATENT DOCUMENTS

| | | | | |
|---|---|---|---|---|
| 5,455,629 | A | * | 10/1995 | Sun et al. ............... 375/240.27 |
| 5,475,688 | A | * | 12/1995 | Bridgewater et al. ........ 370/394 |
| 2001/0030963 | A1 | * | 10/2001 | Yoshimura et al. .......... 370/393 |
| 2003/0126238 | A1 | * | 7/2003 | Kohno et al. ................ 709/220 |

FOREIGN PATENT DOCUMENTS

| | | |
|---|---|---|
| JP | 2003-209839 | 7/2003 |
| JP | 2003-244676 | 8/2003 |

OTHER PUBLICATIONS

Edwards, E. et al., RTP Payload Format for JPEG-2000 codestream, [Online], Proceedings of the Fifty-Second Internet Engineering Task Force, [Retrieved on Dec. 24, 2003], Retrieved from the Internet: <URL:http://www.ietf.org/proceedings/01dec/slides/avt-8/> Dec. 2001.

Keller, R. et al., An Active Router Architecture for Multicast Video Distribution, Proc. of INFOCOM 2000, vol. 3, pp. 1137 to 1146; especially, pp. 1139 to 1141, Mar. 26, 2000.

Okumura, Seiji et al., "MPEG-4 over RTP Haishin System to QoS Seigyo Hoshiki", Information Processing Society of Japan Multimedia, Bunsan Kyocho to Mobile (DICOMO'2000) Symposium Ronbunshu, pp. 433 to 434; particularly p. 434, Migidan Jun. 28, 2000.

* cited by examiner

FIG. 5

| LAYER | NUMBER OF PACKETS | IMAGE QUALITY (bpp) |
|---|---|---|
| L0 | 20 | 0.5 |
| L1 | 25 | 0.7 |
| L2 | 45 | 1.0 |

```
S->C:  OPTIONS * RTSP/1.0
          CSeq: 1
          Packet-layer-bpp:L0 20 0.5 L1 45 0.7 L2 90 1.0

C->S:  RTSP/1.0 200 OK
          CSeq: 1
```

FIG. 17

| TIMESTAMP (181) | AMOUNT OF RECEIVED DATA (182) | FLAG (183) |
|---|---|---|
| 1000 | 0 | 0 |

FIG. 18

| TIMESTAMP (181) | AMOUNT OF RECEIVED DATA (182) | FLAG (183) |
|---|---|---|
| 1000 | 90 | 0 |
| 2000 | 0 | 0 |

FIG. 19

| TIMESTAMP (181) | AMOUNT OF RECEIVED DATA (182) | FLAG (183) |
|---|---|---|
| 1000 | 90 | 0 |
| 2000 | 1 | 0 |

FIG. 20

| TIMESTAMP (181) | AMOUNT OF RECEIVED DATA (182) | FLAG (183) |
|---|---|---|
| 1000 | 90 | 0 |
| 2000 | 40 | 1 |

FIG. 21

| TIMESTAMP 181 | AMOUNT OF RECEIVED DATA 182 | FLAG 183 |
|---|---|---|
| 1000 | 90 | 0 |
| 2000 | 40 | 1 |
| 3000 | 10 | 1 |
| 4000 | 90 | 0 |

TRANSMITTING/RECEIVING SYSTEM, TRANSMITTING APPARATUS, TRANSMITTING METHOD, RECEIVING APPARATUS, RECEIVING METHOD, RECORDING MEDIUM, AND PROGRAM

TECHNICAL FIELD

The present invention relates to a transmission and reception system, a transmission apparatus and transmission method, a reception apparatus and reception method, a recording medium, and a program. More particularly, the present invention relates to a transmission and reception system, a transmission apparatus and transmission method, a reception apparatus and reception method, a recording medium, and a program in which, even when some of received image data is lost, a good-quality image can be displayed.

BACKGROUND ART

In recent years, various types of processing have been proposed with regard to transfer errors which occur when moving image data is transferred using the Internet, etc.

In MPEG4 (Moving Picture Experts Group 4), portions where a transfer error has occurred are discarded by using a resynchronization marker, RVLC (Reversible Variable Length Code), etc., so that the error tolerance is improved.

Furthermore, as error concealment technology for hiding errors which have occurred so as to be made inconspicuous, a process has been proposed in which, by using the correlation characteristics in the time direction of a moving image, a previous frame is played back, or the image is replaced with information from the same position as that of a past frame.

However, when error tolerance is improved through the use of RVLC, it has been pointed out that the coding efficiency is decreased. Furthermore, there are problems in that processing for the above-mentioned error concealment is complex, and coping with a sudden change in an image, such as a scene change, is difficult.

Accordingly, error concealment technology has been proposed in which, when hierarchically coded image data is transferred, in a case where some of a transmitted frame is lost and the complete frame is not transmitted to the reception side, the lost frequency components are generated on the basis of the data which has been received and stored on the reception side up to the time the loss has occurred, and frequency components of a higher-order hierarchy are reconstructed (refer to, for example, Japanese Unexamined Patent Application Publication No. 10-243400 (page 7)).

However, when low-level information, of which there is a large amount in image information, is lost, there is the problem of image quality deterioration.

DISCLOSURE OF INVENTION

The present invention has been made in view of such circumstances, and aims to allow displaying of a good-quality image even when received image data has defects.

In the transmission and reception system of the present invention, a transmission apparatus includes: coding means for coding content into hierarchy codes and for outputting coded data of a plurality of layers; packetization means for packetizing the coded data of the plurality of layers and for outputting packets from low-level information of the coded data; and transmission means for transmitting the packets, and a reception apparatus includes: reception means for receiving the packets transmitted from the transmission apparatus; holding means for holding the packets received by the reception means; writing control means for controlling the writing of the packets received by the reception means into the holding means; and determination means for determining whether or not there is packet loss in the packets transmitted from the transmission apparatus, wherein, when there is packet loss within one frame of the content, the writing control means writes the packets received up to the time the packet loss within one frame has occurred into the holding means, and does not write the remaining packets of the one frame into the holding means.

The transmission and reception system may further include: decoding control means for controlling the decoding of the coded data placed in the packets held in the holding means; decoding means for decoding the coded data; and threshold-value holding means for holding a threshold value with regard to the decoding of the decoding means, wherein the decoding control means controls the decoding by the decoding means in accordance with the threshold value.

The transmission apparatus may further transmit frame information containing the number of packets of the coded data for each of the plurality of layers and information on the image quality of an image, which is obtained by decoding the coded data. The reception means may further receive the frame information. The decoding control means may control the decoding by the decoding means in accordance with the threshold value held in the threshold-value holding means and the frame information.

In the transmission and reception method of the present invention, the transmission method of the transmission apparatus includes: a coding step of coding the content into hierarchy codes and of outputting coded data of a plurality of layers; a packetization step of packetizing the coded data of the plurality of layers and of outputting packets from low-level information of the coded data; and a transmission step of transmitting the packets, and the reception method of the reception apparatus includes: a reception step of receiving the packets transmitted from the transmission apparatus; a writing control step of controlling the writing of the packets received in the process of the reception step; and a determination step of determining whether or not there is packet loss in the packets transmitted from the transmission apparatus. When there is packet loss within one frame of the content, in the writing control step, the packets received up to the time the packet loss within the one frame has occurred are written, and the remaining packets of the one frame are not written.

The transmission apparatus of the present invention includes: coding means for coding content into hierarchy codes and for outputting coded data of a plurality of layers; packetization means for packetizing the coded data of the plurality of layers and for outputting packets from low-level information of the coded data; and holding means for holding frame information containing the number of packets of the coded data for each of the plurality of layers and information on the image quality of an image, which is obtained by decoding the coded data; and transmission means for transmitting the packets and the frame information, wherein the coding means codes the content into hierarchy codes in accordance with the frame information, and the packetization means packetizes the coded data of the plurality of layers in accordance with the frame information.

The transmission method of the present invention includes: a coding step of coding content into hierarchy codes and of outputting coded data of a plurality of layers; a packetization step of packetizing the coded data of the plurality of layers and of outputting packets from low-level information of the coded data; and a holding step of holding frame information containing the number of packets of the coded data for each of the plurality of layers and information on the image quality of an image, which is obtained by decoding the coded data; and a transmission step of transmitting the packets and the frame information, wherein, in the coding step, the content is coded into hierarchy codes in accordance with the frame information, and in the packetization step, the coded data of the plurality of layers is packetized in accordance with the frame information.

The program recorded on a first recording medium of the present invention includes a coding step of coding content into hierarchy codes and of outputting coded data of a plurality of layers; a packetization step of packetizing the coded data of the plurality of layers and of outputting packets from low-level information of the coded data; and a transmission step of transmitting frame information containing the number of packets of the coded data for each of the plurality of layers and information on the image quality of an image, which is obtained by decoding the coded data, wherein, in the coding step, the content is coded into hierarchy codes in accordance with the frame information, and in the packetization step, the coded data of the plurality of layers is packetized in accordance with the frame information.

The first program of the present invention includes a coding step of coding content into hierarchy codes and of outputting coded data of a plurality of layers; a packetization step of packetizing the coded data of the plurality of layers and of outputting packets from low-level information of the coded data; and a transmission step of transmitting frame information containing the number of packets of the coded data for each of the plurality of layers and information on the image quality of an image, which is obtained by decoding the coded data, wherein, in the coding step, the content is coded into hierarchy codes in accordance with the frame information, and in the packetization step, the coded data of the plurality of layers is packetized in accordance with the frame information.

The reception apparatus of the present invention includes: receiving means for receiving the packets transmitted from the transmission apparatus; holding means for holding the packets received by the receiving means; writing control means for controlling the writing of the packets received by the receiving means into the holding means; and determination means for determining whether or not there is packet loss in the packets transmitted from the transmission apparatus, wherein, when there is packet loss within one frame of the content, the writing control means writes the packets received up to the time the packet loss within one frame has occurred into the holding means, and does not write the remaining packets of the one frame into the holding means.

The reception apparatus may further include: decoding control means for controlling the decoding of the coded data placed in the packets held in the holding means; decoding means for decoding the coded data; and threshold-value holding means for holding a threshold value with regard to the decoding of the decoding means, wherein the decoding control means may control decoding by the decoding means in accordance with the threshold value.

The transmission apparatus may further transmit frame information containing the number of packets of the coded data for each of the plurality of layers and information on the image quality of an image, which is obtained by decoding the coded data. The receiving means may further receive the frame information, and the decoding control means may control decoding by the decoding means in accordance with the threshold value held in the threshold-value holding means and the frame information.

The reception apparatus may further include: storage means for storing the content decoded by the decoding means; display control means for controlling the display of the content; and display means for displaying the content, wherein, when the decoding of the coded data is not permitted by the decoding control means, the display control means may make the display means display the content that is stored in the storage means earlier than content corresponding to the coded data.

The reception method of the present invention includes a receiving step of receiving the packets transmitted from the transmission apparatus; a writing control step of controlling the writing of the packets received in the process of the receiving step; and a determination step of determining whether or not there is packet loss in the packets transmitted from the transmission apparatus, wherein, when there is packet loss within one frame of the content, in the writing control step, the packets received up to the time the packet loss within one frame has occurred are written, and the remaining packets of the one frame are not written.

The program recorded on a second recording medium of the present invention includes a receiving step of receiving packets transmitted from a transmission apparatus; a writing control step of controlling the writing of the packets received in the process of the receiving step; and a determination step of determining whether or not there is packet loss in the packets transmitted from the transmission apparatus, wherein, when there is packet loss within one frame of the content, in the process of the writing control step, the packets received up to the time the packet loss within one frame has occurred are written, and the remaining packets of the one frame are not written.

The second program of the present invention includes a receiving step of receiving packets transmitted from a transmission apparatus; a writing control step of controlling the writing of the packets received in the process of the receiving step; and a determination step of determining whether or not there is packet loss in the packets transmitted from the transmission apparatus, wherein, when there is packet loss within one frame of the content, in the process of the writing control step, the packets received up to the time the packet loss within the one frame has occurred are written, and the remaining packets of the one frame are not written.

In a first aspect of the present invention, content is coded into hierarchy codes, coded data of a plurality of layers is output, the coded data of the plurality of layers is packetized, packets are output from low-level information of the coded data, and the packets are transmitted and received. A check is made to determine whether or not there is packet loss in the received packets. When there is packet loss within one frame of the content, the packets received up to the time the packet loss within one frame has occurred are written, and the remaining packets of the one frame are not written.

In a second aspect of the present invention, content is coded into hierarchy codes in accordance with frame information containing information on the image quality of an image, which is obtained by decoding coded data, and coded data of a plurality of layers is output. Furthermore, the coded data of the plurality of layers is packetized, and packets are output from low-level information of the coded data in accordance with the frame information. Then, the packets and the frame information are transmitted.

In a third aspect of the present invention, packets transmitted from the transmission apparatus are received, and a check is made to determine whether or not there is packet loss in the received packets. When there is packet loss within one frame of the content, the packets received up to the time the packet loss within one frame has occurred are written, and the remaining packets of the one frame are not written.

BRIEF DESCRIPTION OF THE DRAWINGS

FIG. 5 shows an example of frame information held in a frame information holding section.

FIG. 6 shows an example of messages which are transmitted by the server and a client of FIG. 1 to and from each other.

FIG. 17 shows an example of entry information entered into an entry information storage section in the process of step S68 in FIG. 15.

FIG. 18 shows an example of entry information entered into the entry information storage section in the process of step S68 in FIG. 15.

FIG. 19 shows an example of entry information of the entry information storage section, which is incremented in the process of step S70 in FIG. 15.

FIG. 20 shows an example of entry information of the entry information storage section, which is set in the process of step S73 in FIG. 15.

FIG. 21 shows an example of entry information of the entry information storage section of FIG. 10.

BEST MODE FOR CARRYING OUT THE INVENTION

Figure 1:
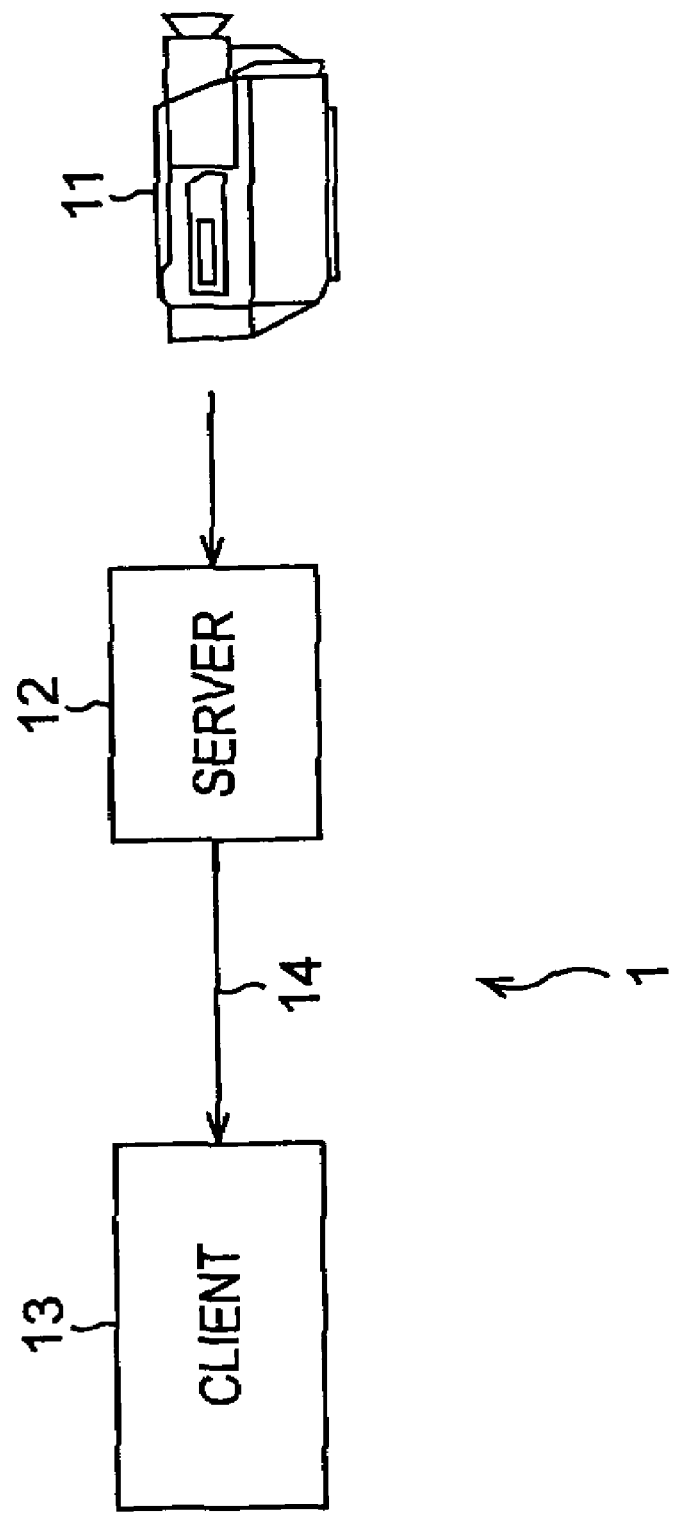
FIG. 1 is a block diagram showing an example of the configuration of an information processing system to which the present invention is applied.

FIG. 1 shows an example of the configuration of an information processing system 1 to which the present invention is applied.

In this information processing system 1, a server 12 transmits image data input via a video camera 11 to a client 13 via a network 14 such as a packet communication network.

Figure 8:
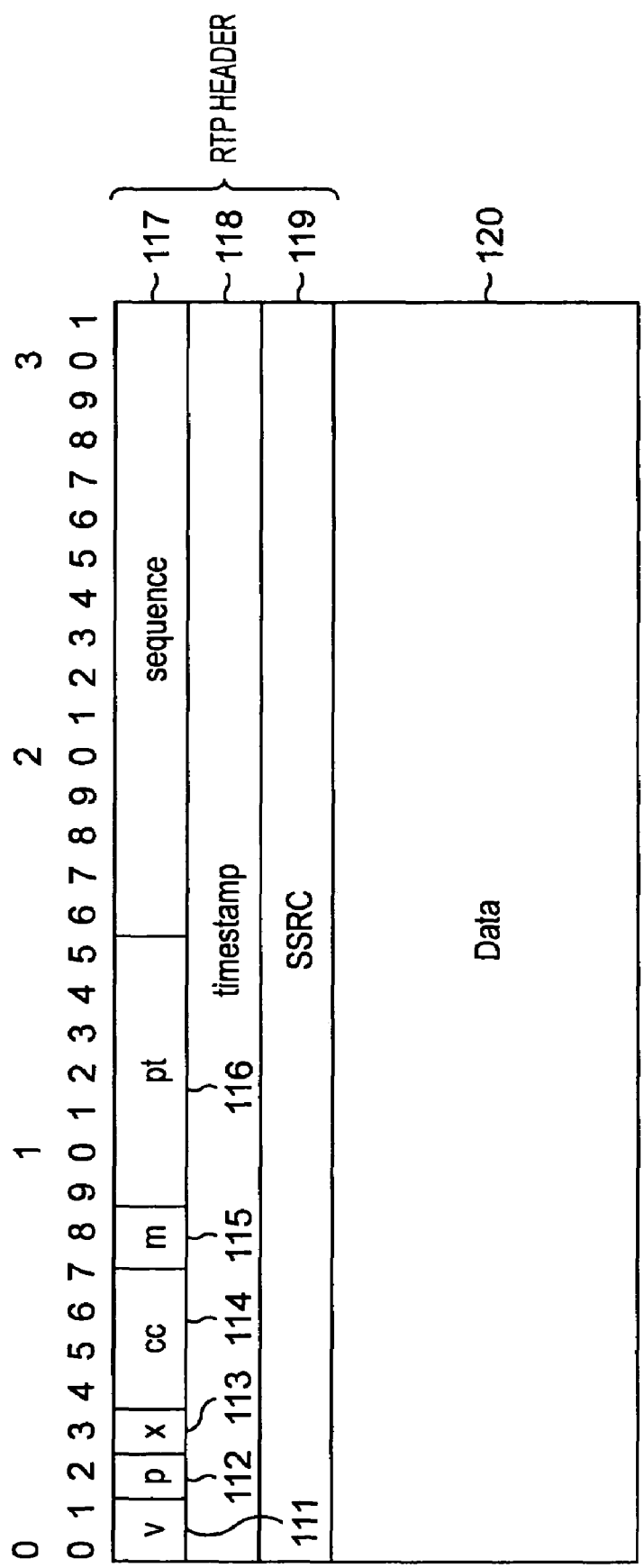
FIG. 8 shows an example of the format of an RTP packet to be transmitted by a communication section of FIG. 2.

When the data of the image captured by the video camera 11 is input, the server 12 encodes the image data in order to generate RTP (Real-time Transport Protocol) packets (FIG. 8, to be described later). The server 12 transmits the generated RTP packets (image data) to the client 13 via the network 14. Furthermore, the server 12 transmits frame information (FIG. 5, to be described later) input by a user to the client 13.

When the image data is received and there is packet loss within one frame, the client 13 holds the image data received up to the time the packet loss has occurred. Based on the received frame information, the client 13 determines whether or not the image quality of the held image data or the amount thereof is greater than or equal to a threshold value set by the user. When it is greater than or equal to the threshold value, the client 13 decodes the image data and displays the decoded image data on a display section such as a display. When it is not greater than or equal to the threshold value, the image of the previous frame is displayed.

Figure 2:
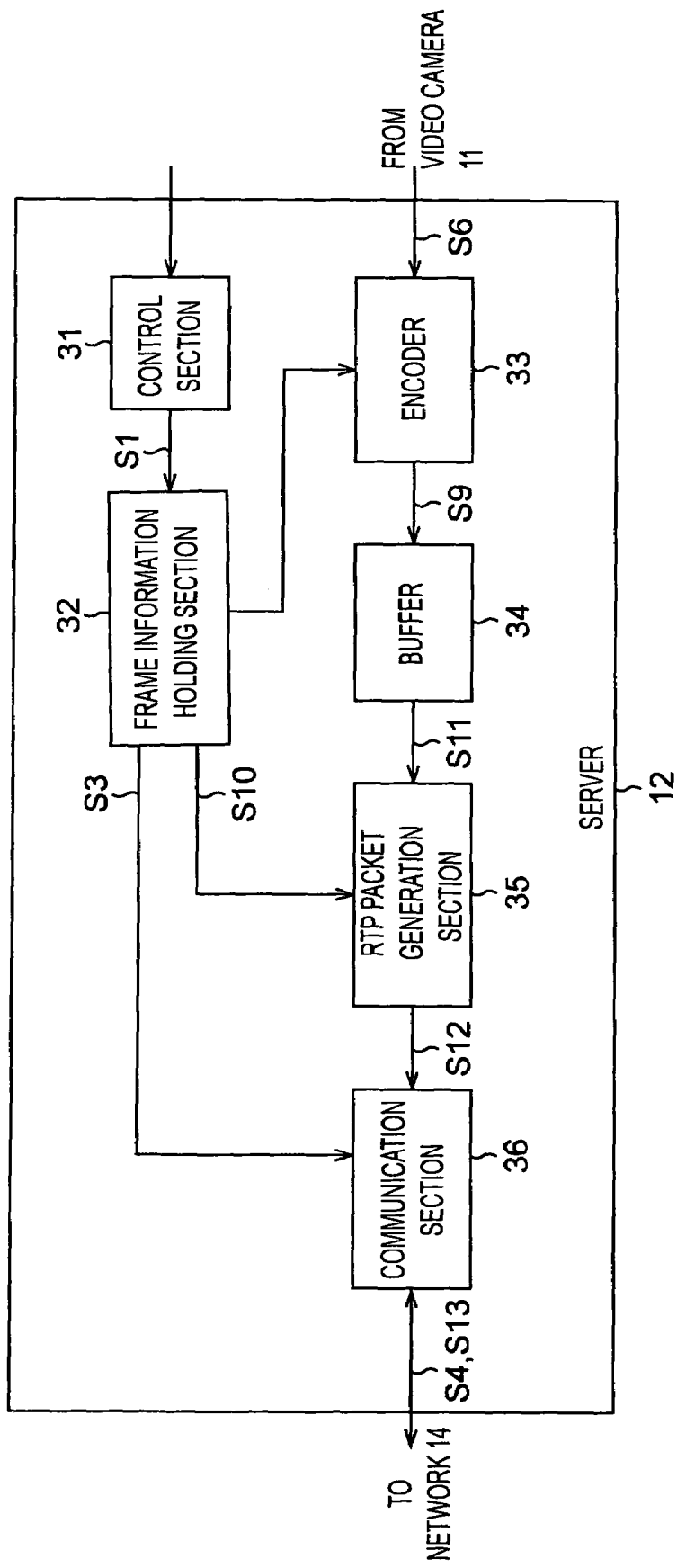
FIG. 2 is a block diagram showing an example of the configuration of a server of FIG. 1.

FIG. 2 shows the configuration of the server 12. In the figure, the arrows indicated by a symbol formed of the character "S" and a numeral correspond to steps in the process of the flowcharts of FIGS. 3 and 4 (to be described later).

For example, frame information, which is input by a user, is supplied to a control section 31. The control section 31 supplies the frame information of the image data input by the user to a frame information holding section 32. The frame information holding section 32 holds the frame information supplied from the control section 31. Here, the frame information is formed of the number of packets for each layer of one frame and the image quality, the details of which will be described later with reference to FIG. 5.

When the data of the image captured by the video camera 11 is input, an encoder 33 encodes the image data by hierarchy coding, such as JPEG (Joint Photographic Experts Group) 2000. The encoder 33 makes a determination as to in which hierarchy (layer) each frame of the image data should be hierarchically coded in accordance with the frame information stored in the frame information holding section 32.

The encoder 33 supplies the encoded image data to a buffer 34, where the data is held. An RTP packet generation section 35 obtains the image data stored (held) in the buffer 34, and RTP-packetizes the image data in accordance with the number of packets for each layer in the frame information held in the frame information holding section 32.

Then, the RTP packet generation section 35 supplies the packets obtained by RTP-packetizing the image data to a communication section 36. The communication section 36 supplies the packets of the image data supplied from the RTP packet generation section 35 to the client 13 via the network 14. Furthermore, the communication section 36 obtains the frame information from the frame information holding section 32 and transmits the frame information to the client 13 via the network 14.

Next, referring to FIGS. 3 and 4, an image data transmission process in the server 12 of FIG. 2 will be described below. This process is started when image data is input to the server 12 from the video camera 11 or when the server 12 is instructed by the user to perform an image data transmission process.

In step S1, the control section 31 holds, in the frame information holding section 32, the number of packets and the image quality (hereinafter referred to as "frame information" as appropriate) of each layer, which is input by the user. It is assumed that the frame information is input in advance, for example, by the user operating an operation section (not shown), etc.

Here, FIG. 5 shows the frame information held in the frame information holding section 32. Frame information 50 is formed of (information indicating) a layer 51, (information indicating) the number of packets 52 and (information indicating) image quality 53. In FIG. 5, it is shown that one frame is formed of three layers, that is, layer "L0", layer "L1", and layer "L2". In FIG. 5, it is shown that the number of packets 52 of layer "L0" is set to "20"; therefore, the layer "L0" is composed of "20" packets. Furthermore, the image quality of the layer "L0" is set at "0.5 bpp (bits-per-pixel)".

Similarly, in FIG. 5, the layer "L1" is composed of "25" packets, and the image quality 53 is set to "0.7 bpp". The layer "L2" is composed of "45" packets, and the image quality 53 is set to "1.0 bpp". From the above, according to the frame information of FIG. 5, one frame is composed of "20+25+45=90" packets.

Referring back to FIG. 3, after the process of step S1, the process proceeds to step S2, where the RTP packet generation section 35 initializes the timestamp added for each frame, and the process proceeds to step S3. That is, the RTP packet generation section 35 sets the value of the timestamp to be added to the first frame.

In step S3, the communication section 36 obtains frame information from the frame information holding section 32, and the process proceeds to step S4. In step S4, the communication section 36 transmits the frame information obtained from the frame information holding section 32 to the client 13 via the network 14 by using a streaming session management protocol such as RTSP (Real-time Streaming Protocol). RTSP is defined in the RFC (Request For Comment) 2326.

Here, FIG. 6 shows examples of a message to be transmitted from the server 12 to the client 13 and an acknowledgement message transmitted by the client 13 receiving the message to the server 12 when the server 12 transmits frame information to the client 13 by using RTSP.

"S→C" indicates a message transmitted from the server 12 to the client 13, and "C→S" indicates a message transmitted from the client 13 to the server 12. "OPTIONS" indicates a method, and "OPTIONS*RTSP/1.0" indicates an expansion method. Furthermore, "CSeq" indicates a message number of RTSP, and "Packet-layer-bpp" indicates a header. In the header, one set of three pieces of information, that is, the layer name, the accumulated number of packets (the number of packets up to the layer of the layer name), and the image quality of the layer, is described, or the information is repeatedly described.

In the case of the example of FIG. 6, the message transmitted from the server 12 to the client 13 is a message of an expansion method whose RTSP number is "1". In the header, the information shown in FIG. 5 is described. That is, in FIG. 5, for the layer L0, the accumulated number of packets (the number of packets of the layer L0) is "20", and the image quality is "0.5 bpp". For the layer L1, the accumulated number of packets (the sum of the numbers of packets of the layer L0 and the layer L1) is "45" (the number of packets of the layer L1 is "25"), and the image quality is "0.7 bpp". For the layer L2, the accumulated number of packets (the sum of the numbers of packets of the layer L0, the layer L1, and the layer L2) is "90" (the number of packets of the layer L2 is "45"), and the image quality is "1.0 bpp". For this reason, in the header of the message transmitted from the server 12 to the client 13, as shown in FIG. 6, "L0 20 0.5 L1 45 0.7 L2 90 1.0" is described.

Furthermore, the message, shown in FIG. 6, which is transmitted from the client 13 to the server 12, is a message which notifies that the message of the expansion method whose RTSP number is "1" (the message transmitted from the server 12 to the client 13) is received.

Referring back to FIG. 3, in step S4, after (the message in which) the frame information (is described) is transmitted from the server 12 to the client 13, the process proceeds to step S5, where, based on a frame rate which is set in advance (for example, 30 frames/second), the encoder 33 sets a time for one frame (33 ms in this case) to the timer (not shown) provided in the encoder 33, and the process proceeds to step S6. In step S6, the encoder 33 obtains the data of the image captured via the video camera 11, and the process proceeds to step S7. In step S7, the encoder 33 determines whether or not the predetermined time set in the timer (33 ms in this case) has elapsed (whether the timer is terminated), and performs a process for obtaining the image data until it is determined that the predetermined time has elapsed.

When the encoder 33 determines in step S7 that the predetermined time has elapsed, the process proceeds to step S8, where the obtainment of the image data is completed, and the encoder 33 encodes the obtained image data. That is, the encoder 33 encodes the image data for one frame by performing hierarchy coding thereon in accordance with the frame information stored in the frame information holding section 32, and obtains the coded data as the encoded result. Then, the process proceeds to step S9 of FIG. 4, where the encoder 33 supplies the coded data obtained by encoding the image data for one frame to the buffer 34, where the image data is held.

Figure 7:
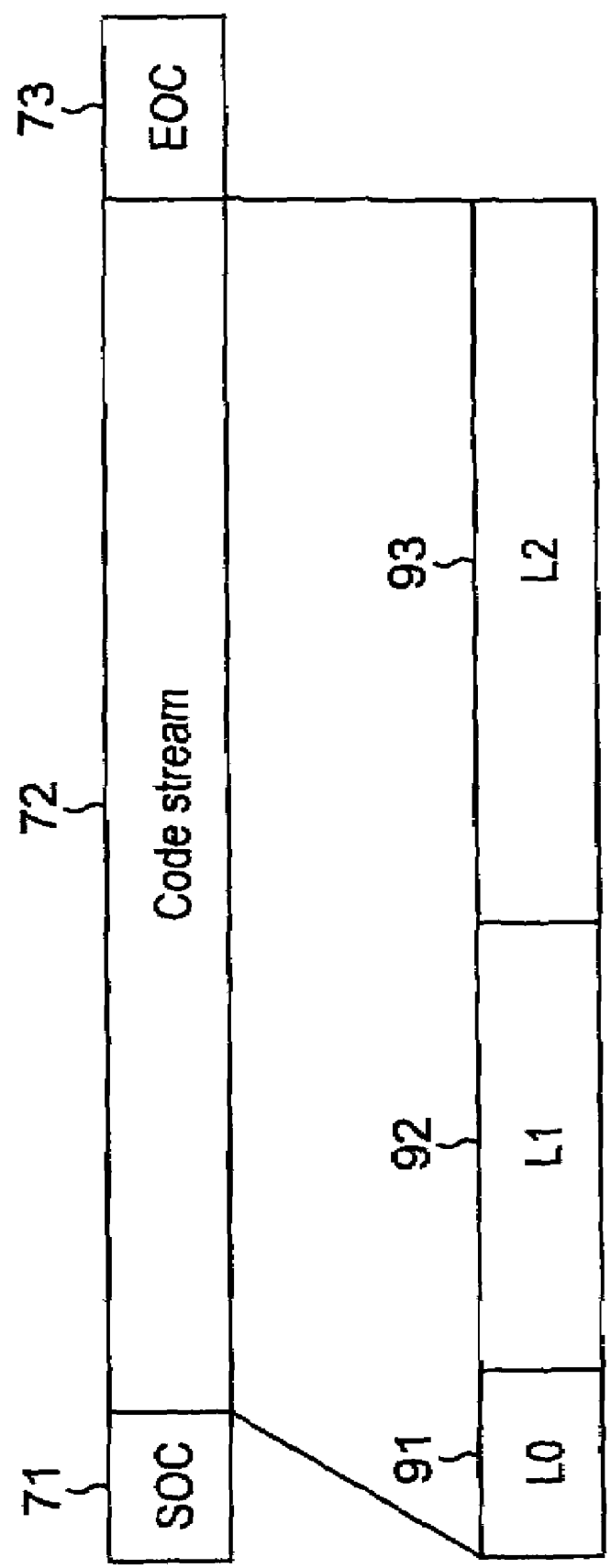
FIG. 7 shows an example of data encoded by an encoder of FIG. 2.

Here, FIG. 7 shows the coded data for one frame, which is held in the buffer 34. The coded data is composed of an SOC (Start Of Code stream) 71, a code stream 72, and an EOC (End Of Code stream). The SOC 71 is data indicating the start of the coded data, and the EOC 73 is data indicating the end of the coded data. Furthermore, the code stream 72 is encoded image data.

Here, for example, JPEG 2000, which is hierarchy coding performed in the encoder 33, is compatible with a plurality of types of progressive displays in which the resolution, the compression rate, etc., differ. Furthermore, JPEG 2000 is compatible with image quality scalable (SNR (Signal to Noise Ratio)). In this embodiment, the encoder 33 hierarchically codes the image data, for example, in image-quality scalable manner in accordance with the frame information shown in FIG. 5 by the JPEG 2000 method, and places the data of each hierarchy (layer) in the code stream 72.

As a result, in FIG. 7, the code stream 72 is formed as a hierarchy of data 91 of the layer L0, data 92 of the layer L1, and data 93 of the layer L2 in accordance with the frame information shown in FIG. 5. The data 91 of the layer L0 is formed as low-level information of the image data, and the data 92 of the layer L1 is formed as medium-level information of the image data. Furthermore, the data 93 of the layer L2 is formed as high-level information of the image data.

Therefore, when the data 91 of the layer L0 is decoded, an image having the same space resolution as that of the original image having a low image quality (in the case of the example of FIG. 5, the image having an image quality of 0.5 bpp) is obtained. Furthermore, when the data up to the data 92 of the layer L1 (the data of the layer L0 and the data of the layer L1) is decoded, an image having an image quality higher than that when only the data 91 of the layer L0 is decoded (in the case of the example of FIG. 5, the image having an image quality of 0.75 bpp) is obtained. Furthermore, when the data up to the data 93 of the layer L2 (the data 91 of the layer L0, the data 92 of the layer L1, and the data 93 of the layer L2) is decoded, an image having a still better image quality (in the case of the example of FIG. 5, the image having an image quality of 1.0 bpp) can be obtained.

The encoder 33 performs hierarchy coding so that the image of the image quality in the frame information can be obtained when the coded data is decoded, and obtains the data of the layer L0, the data 92 of the layer L1, and the data 93 of the layer L2.

Referring back to FIG. 4, after the process of step S9, the process proceeds to step S10, where the RTP packet generation section 35 obtains the frame information 50 (FIG. 5) from the frame information holding section 32, and the process proceeds to step S11. In step S11, from the coded data for one frame, which is held in the buffer 34, the RTP packet generation section 35 obtains the data of the size at which packets of the number of packets for each layer in the frame information 50 obtained in step S10 can be obtained, and generates RTP packets.

That is, when the RTP packet generation section 35 obtains the frame information 50 shown in FIG. 5, the RTP packet generation section 35 generates 20 RTP packets from the data 91 of the layer L0, 25 RTP packets from the data 92 of the layer L1, and 45 RTP packets from the data 93 of the layer L2.

After the RTP packets are generated in step S11, the process proceeds to step S12, where the RTP packet generation section 35 supplies the generated RTP packets to the communication section 36 in the sequence of the layer L0 to the layer L2, and the process proceeds to step S13. In step S13, the communication section 36 transmits the RTP packets to the client 13 via the network 14.

Here, FIG. 8 shows an example of an RTP format of an RTP packet to be transmitted to the client 13 by the communication section 36. The RTP header is composed of v 111 indicating the version number, p 112 indicating padding, x 113 indicating the presence or absence of the expansion header, cc 114 indicating the number of transmission sources (counter), m 115 indicating marker information (marker bit), pt 116 indicating a payload type, sequence 117 indicating a sequence number, a timestamp 118 indicating a timestamp, and SSRC 119 indicating a synchronization source (transmission source) identifier. After the RTP header, the coded data is placed as data 120.

The client 13 controls the processing time when the RTP packets are expanded by using the timestamp described in the timestamp 118 so as to perform real-time image or sound reproduction control. The timestamp is determined for each frame, and a common timestamp is set in a plurality of RTP packets in which the coded data of the same frame is placed.

Figure 9:
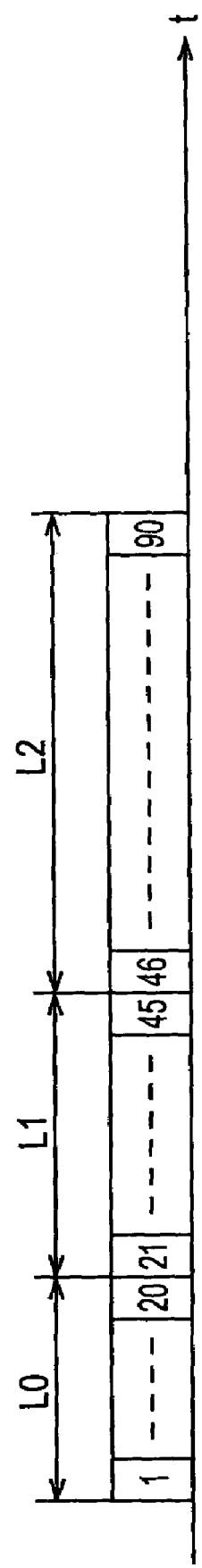
FIG. 9 shows an example of data transmitted by the communication section of FIG. 2.

FIG. 9 shows an example in which the communication section 36 transmits the RTP packets generated in accordance with the frame information 50 shown in FIG. 5 to the client 13 via the network 14. The horizontal axis t indicates time.

Initially, the communication section 36 transmits 20 packets (packets of sequence numbers 1 to 20) of the coded data of the layer L0 (the data 91 of the layer L0 of FIG. 7) (low-level information of the image data). Next, the communication section 36 transmits 45 packets (packets of sequence numbers 21 to 45) of the coded data of the layer L1 (the data 92 of the layer L1 of FIG. 7) (medium-level information of the image data). Finally, the communication section 36 transmits 45 packets (packets of sequence numbers 46 to 90) of the coded data of the layer L3 (the data 93 of the layer L3 of FIG. 7) (high-level information of the image data). This completes the transmission of the coded data of one frame. The sequence number is given in sequence starting from the packet generated from the first encoded image data (the next data of the SOC 71 in FIG. 7) and is placed in the sequence 117 of the RTP packets shown in FIG. 8.

Referring back to FIG. 4, after the RTP packets are transmitted in step S13, the process proceeds to step S14, where the RTP packet generation section updates the timestamp described in the timestamp 118 (FIG. 8) of the RTP packets, and the process proceeds to step S15.

Here, the sequence number placed in the sequence 117 of FIG. 8 is assigned in sequence to the RTP packets. Therefore, this sequence number makes it possible for the client 13 to detect whether or not the received RTP packets are insufficient (lost) with respect to the transmitted RTP packets.

In step S15, the server 12 determines whether or not all the image data are transmitted to the client 13. When the server 12 determines that all the image data are not transmitted to the client 13, the process returns from step S15 to step S5, where the image data captured via the video camera 11 is obtained for each frame, and the process for transmitting the RTP packets is repeated. When the server 12 determines in step S15 that all the image data are transmitted to the client 13, the processing is terminated.

Figure 10:
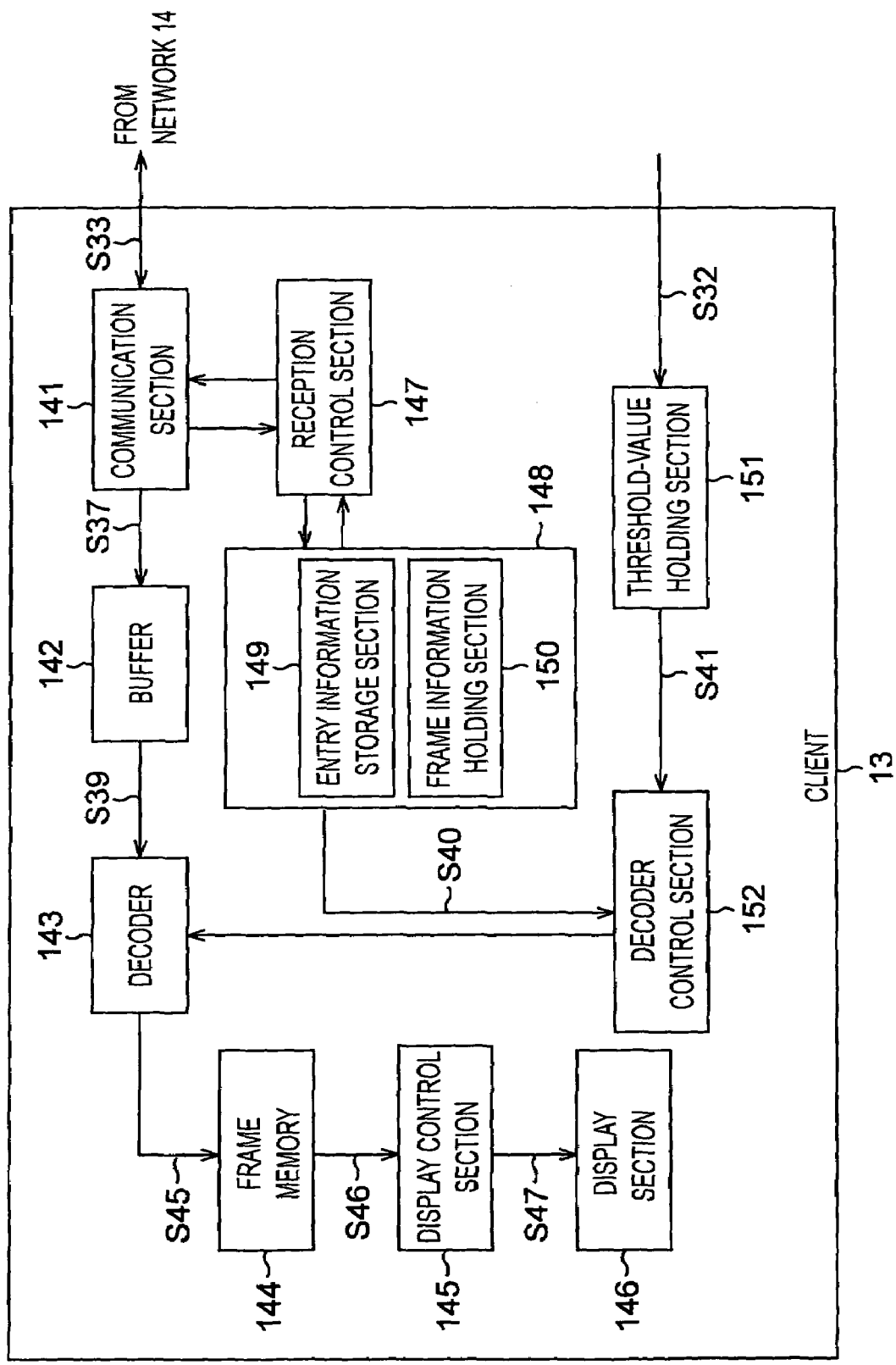
FIG. 10 is a block diagram showing an example of the configuration of the client of FIG. 1.

Next, FIG. 10 shows an example of the configuration of the client 13 of FIG. 1. In the figure, the arrows indicated by a symbol formed of the character "S" and a numeral corresponds to steps in the process of the flowcharts of FIGS. 11 and 13 (to be described later).

A communication section 141 receives the frame information and the RTP packets transmitted from the server 12. A reception control section 147 performs a reception process on the basis of the frame information and the RTP packets received by the communication section 141, and controls the writing of the RTP packets (image data) received by the communication section 141 into a buffer 142. The details of this reception process will be described later with reference to FIGS. 14 to 21.

Furthermore, the reception control section 147 obtains the frame information from the communication section 141 and supplies it to a frame information holding section 150 of an image information holding section 148, where the frame information is held. Furthermore, the reception control section 147 enters the information, for each timestamp (for each frame) of the RTP packets received by the communication section 141, into an entry information storage section 149 of the image information holding section 148, where the information of the image data received in the form of RTP packets (hereinafter referred to as "entry information" as appropriate) is held.

The communication section 141 writes the received RTP packets into the buffer 142 under the control of the reception control section 147. As a result, the buffer 142 temporarily holds the RTP packets supplied from the communication section 141. The decoder 143 obtains the RTP packets held in the buffer 142.

A threshold-value holding section 151 holds, for example, a threshold value of the amount of data (the number of RTP packets) or the image quality for each timestamp, which is input by the user.

A decoder control section 152 determines whether or not the decoding of the RTP packets obtained by the decoder 143 should be permitted on the basis of the threshold value held in the threshold-value holding section 151 and the entry information (FIG. 21, to be described later) held in the entry information storage section 149.

When the decoding is permitted by the decoder control section 152, the decoder 143 decodes the coded data placed in the RTP packets obtained from the buffer 142, and stores the image data obtained as a result of the decoding in a frame memory 144. A display control section 145 obtains the image data stored in the frame memory 144 and displays the image on a display section 146 such as a display.

The image display processing in the client 13 of FIG. 10 will be described in detail with reference to FIGS. 11 to 13. This processing is started when image data is transmitted from the server 12.

In step S31, the client 13 initializes itself, and the process proceeds to step S32. As a result, the data held in the buffer 142, the frame memory 144, the image information holding section 148, and the threshold-value holding section 151 is deleted. In step S32, the threshold-value holding section 151 holds a threshold value of the amount of data (the number of RTP packets) or the image quality, which is input by the user, and the process proceeds to step S33. It is assumed that the threshold value is, for example, input in advance by the user operating an operation section (not shown), etc.

Figure 3:
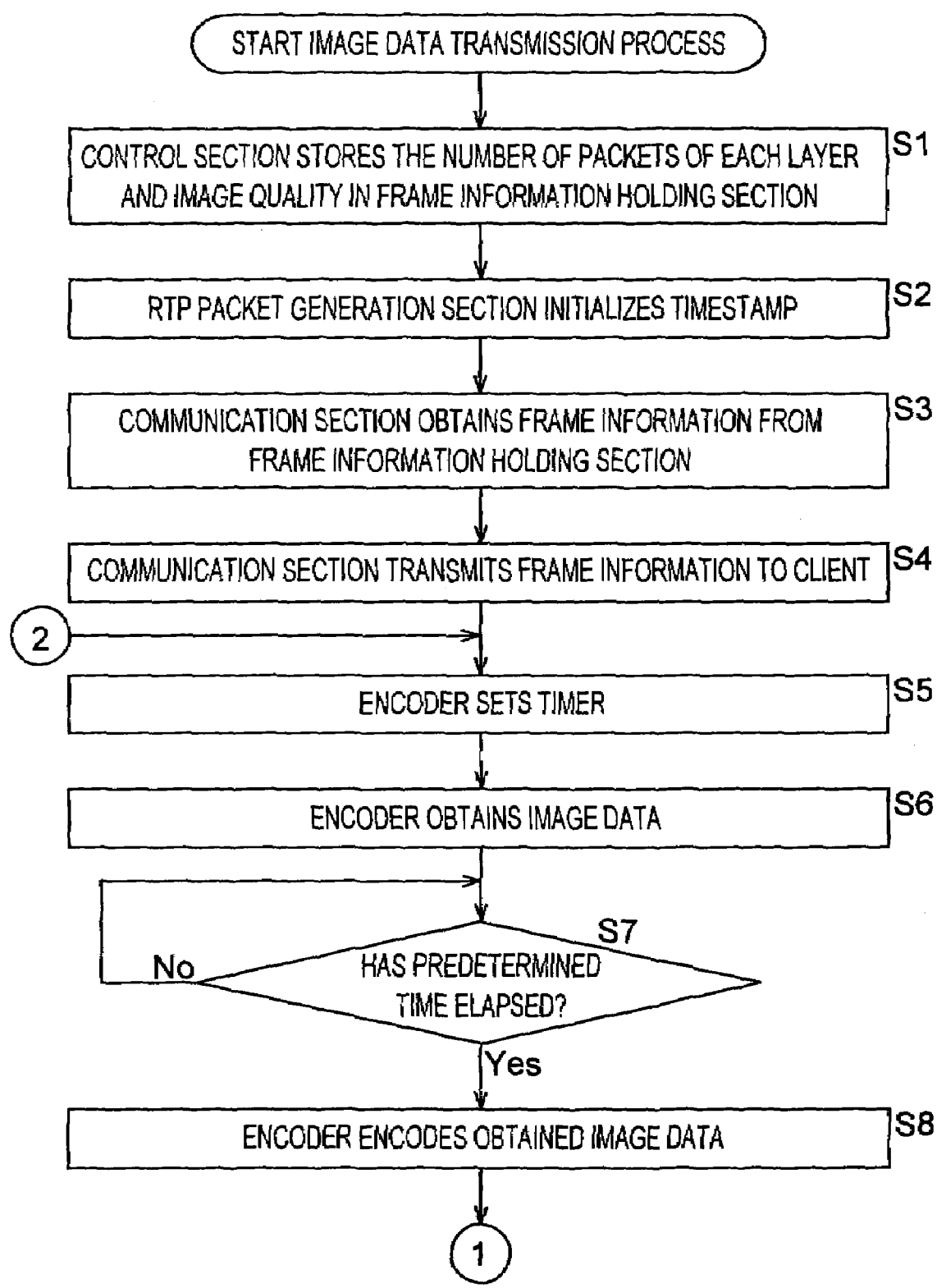
FIG. 3 is a flowchart illustrating an image data transmission process in the server of FIG. 2.
Figure 4:
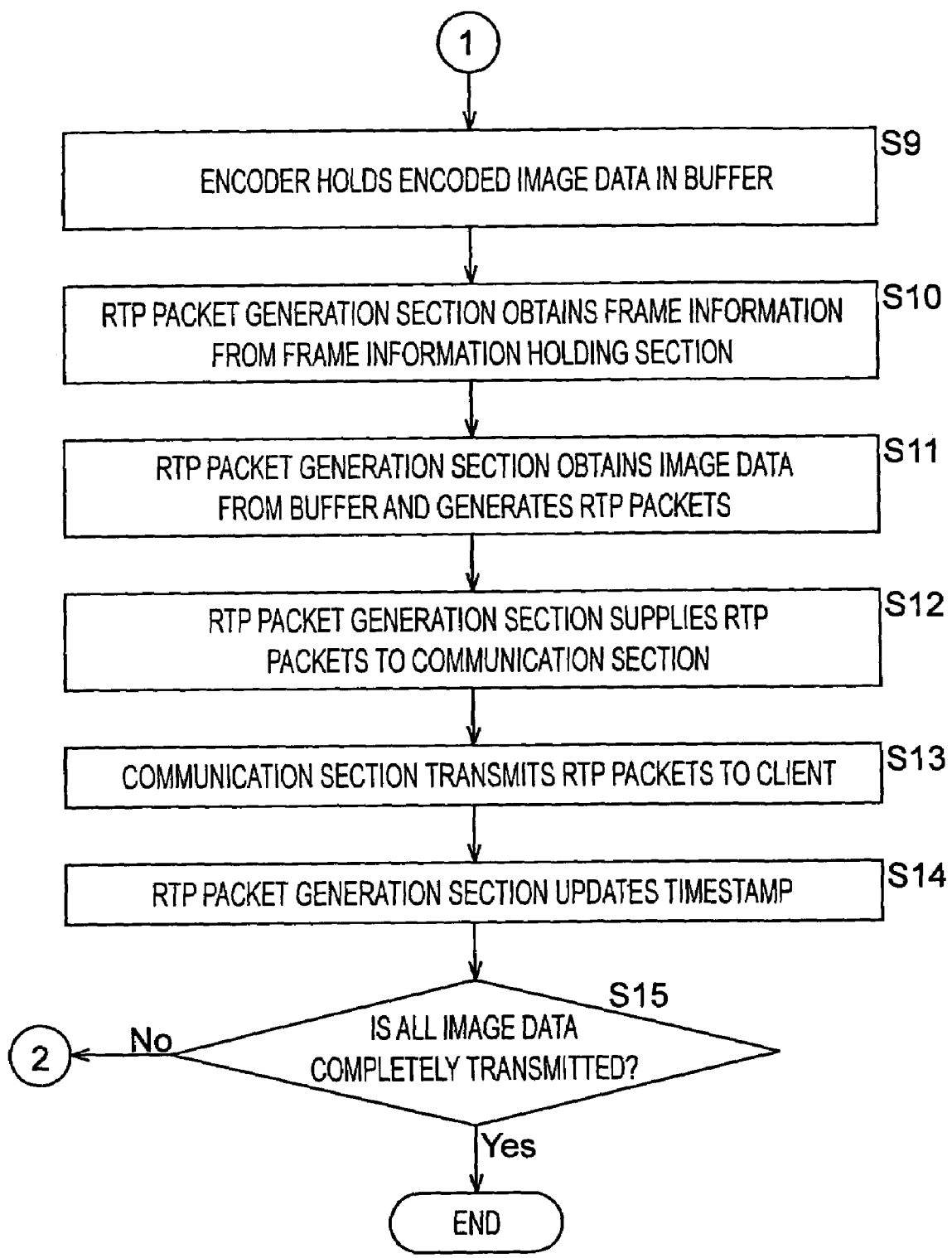
FIG. 4 is a flowchart illustrating the image data transmission process in the server of FIG. 2.

In step S33, the communication section 141 receives, via the network 14, the frame information (FIG. 6) transmitted from the server 12 in the process of step S4 of FIG. 3 or the RTP packets (FIG. 9) transmitted to the client 13 in the process of step S13 of FIG. 4. Then, the process proceeds to step S34.

In step S34, the reception control section 147 obtains the frame information received by the communication section 141 from the communication section 141, supplies it to the frame information holding section 150, where the frame information is held. As a result, the frame information holding section 150 of the image information holding section 148 holds the frame information, which is the same as the frame information held in the frame information holding section 32 of FIG. 2. Therefore, when the frame information shown in FIG. 6 is received by the communication section 141, the frame information shown in FIG. 5 is held in the frame information holding section 150.

After the process of step S34, the process proceeds to step S35, where the reception control section 147 performs a reception process, so that the reception control section 147 makes a determination as to the permission or nonpermission of writing the RTP packets received by the communication section 141, and causes the entry information (to be described later) to be stored in the entry information storage section 149. The details of the reception process will be described later with reference to the flowcharts in FIGS. 14 and 15.

After the process of step S35, the process proceeds to step S36, where the communication section 141 determines whether or not the writing of the RTP packets is permitted from the reception control section 147 in the reception process of step S35. When the writing is permitted from the reception control section 147, the process proceeds from step S36 to step S37, where the communication section 141 supplies the RTP packets received in the process of step S33 to the buffer 142, where the RTP packets are written. As a result, the buffer 142 holds the RTP packets received by the communication section 141.

Then, the process proceeds to step S38, where the decoder 143 determines whether or not the RTP packets for one frame are held in the buffer 142. That is, the decoder 143 sets in advance the time for the reception process for one frame to the incorporated timer (not shown), so that it is determined whether or not the set time is measured by the timer. The decoder 143 repeats the process of step S38 until the RTP packets for one frame are held. When the RTP packets for one frame are held, the process proceeds from step S38 to step S39 of FIG. 12.

In step S39, the decoder 143 obtains, from the buffer 142, the RTP packets for one frame, which are held in the buffer 142 in the process of step S37, and the process proceeds to step S40. In step S40, the decoder control section 152 obtains, from the image information holding section 148, the image information held in the process of steps S34 and 35 of FIG. 11, that is, the entry information held in the entry information storage section 149 and the frame information held in the frame information holding section 150. The process then proceeds to step S41.

In step S41, the decoder control section 152 obtains the threshold value of the amount of decoding (the number of RTP packets) or the image quality, which is held in the threshold-value holding section 151 in the process of step S32, and the process proceeds to step S42. In step S42, the decoder control section 152 performs a decoding determination process in accordance with the image information obtained in the process of step S39 and the threshold value obtained in the process of step S41, and thereby makes a determination as to the permission or nonpermission of the decoding by the decoder 143. This decoding determination process will be described later with reference to the flowchart in FIG. 22.

Figure 13:
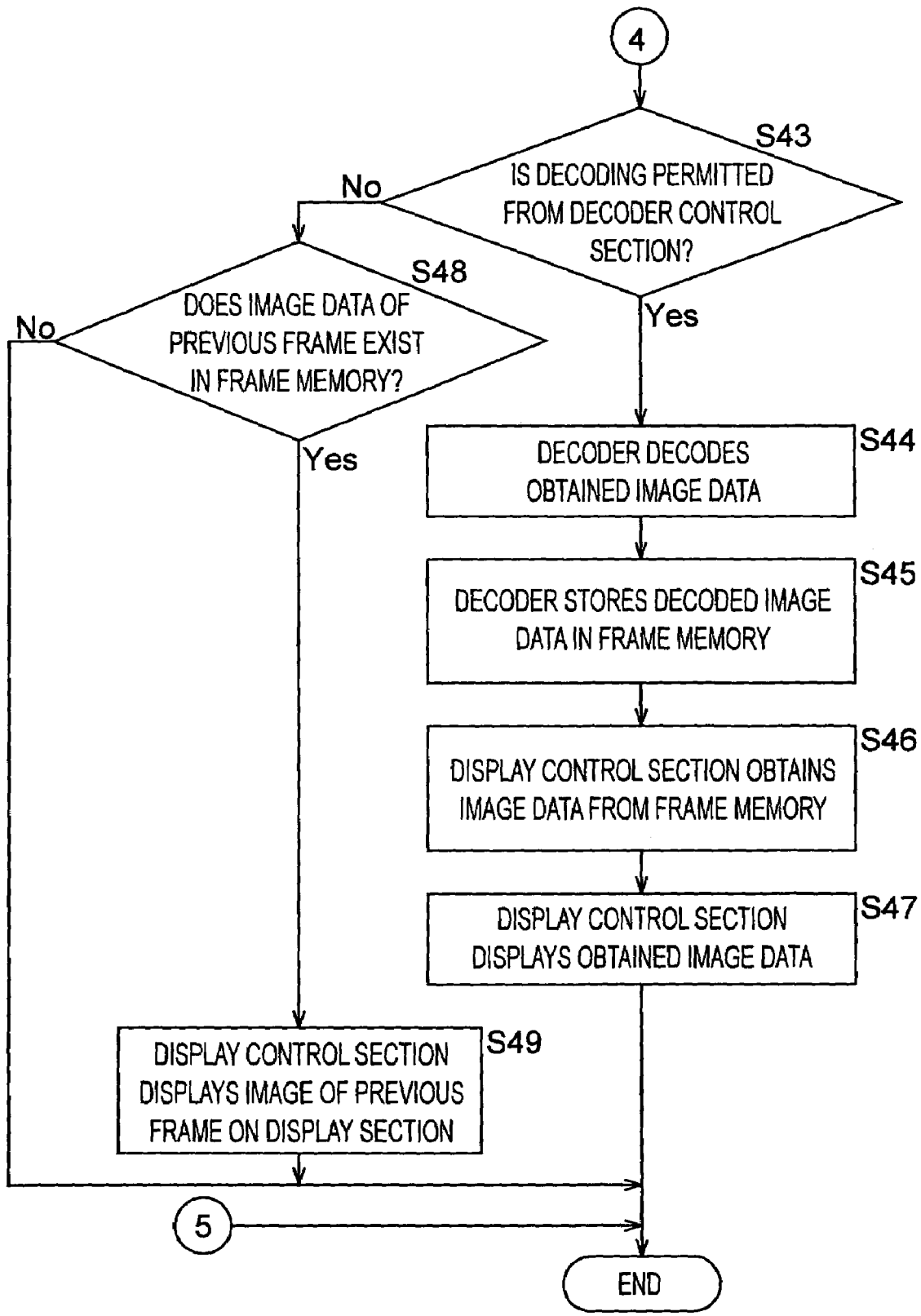
FIG. 13 is a flowchart illustrating the image display process in the client of FIG. 10.

After the process of step S42, the process proceeds to step S43 of FIG. 13, where the decoder 143 determines whether or not the decoding is permitted from the decoder control section 152 in the process of step S42. When the decoding is permitted from the decoder control section 152, the process proceeds from step S43 to step S44, where the decoder 143 decodes the RTP packets obtained from the buffer 142 in the process of step S39, and the process proceeds to step S45.

In step S45, the decoder 143 supplies the decoded image data to the frame memory 144, where the image data is stored, and the process proceeds to step S46. In step S46, the display control section 145 obtains the image data stored in the frame memory 144 in step S45, and the process proceeds to step S47. In step S47, the display control section 145 displays an image on the display section 146 on the basis of the image data obtained in step S46, and the processing is terminated.

On the other hand, when it is determined in step S43 that the decoding is not permitted from the decoder control section 152, the process proceeds to step S48, where the display control section 145 determines whether or not the image data of the previous frame (of the frame which should be displayed now, for example, the frame one frame before, etc.) exists in the frame memory 144. When it is determined in step S48 that the image data of the previous frame exists in the frame memory 144 (when the image data of the previous frame is received, the process of step S45 is performed), the process proceeds to step S49, where the display control section 145 displays the image of the previous frame (the image data stored in the frame memory 144) on the display section 146, and the processing is terminated.

When it is determined in step S48 that the image data of the previous frame does not exist in the frame memory 144, the step S49 is skipped, and the processing is terminated. Therefore, in this case, nothing is displayed on the display section 146.

Figure 12:
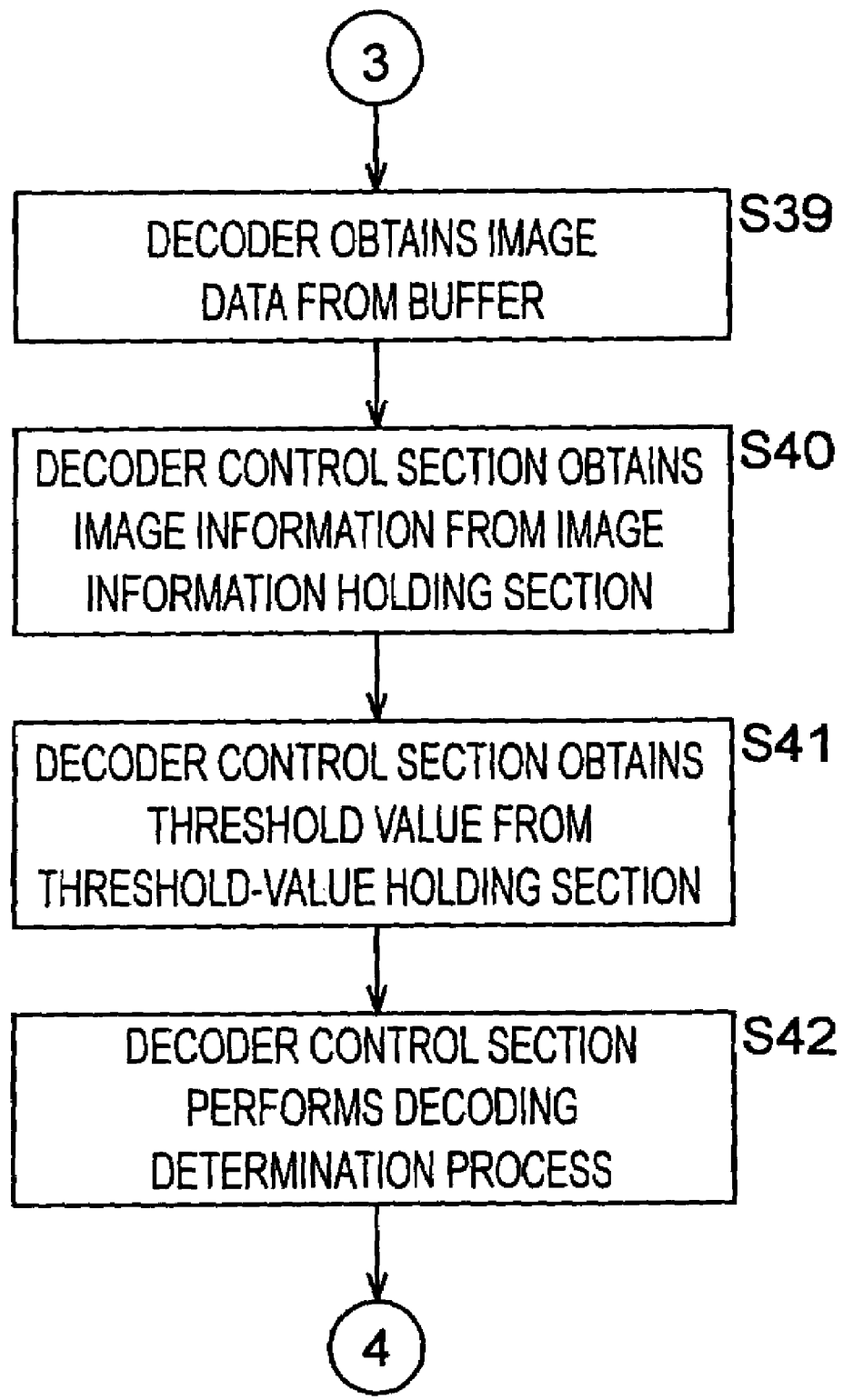
FIG. 12 is a flowchart illustrating the image display process in the client of FIG. 10.

On the other hand, when it is determined in step S36 of FIG. 12 that the writing of the RTP packets is not permitted from the reception control section 147, the communication section 141 does not write the RTP packets into the buffer, and the processing is terminated.

Figure 11:
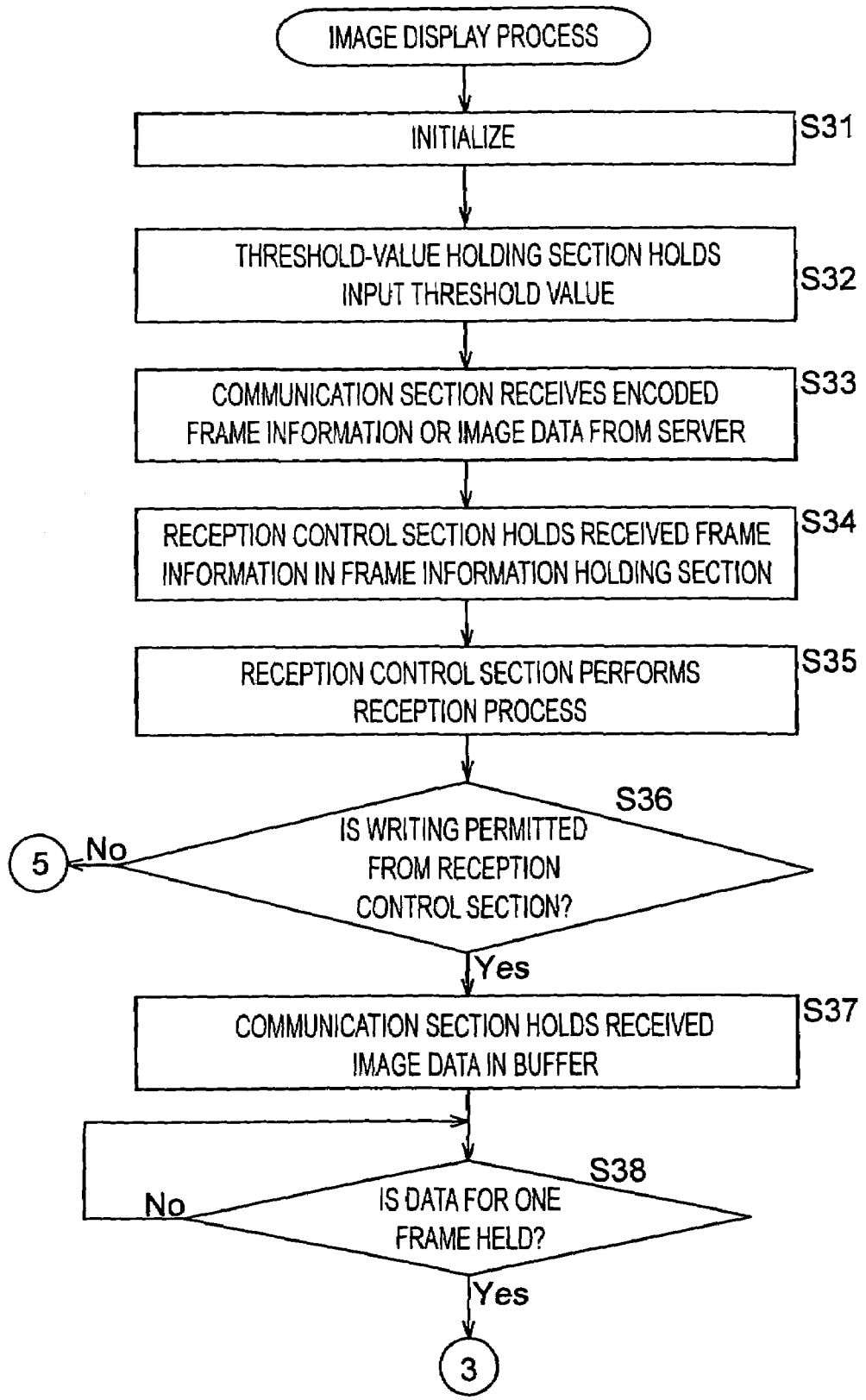
FIG. 11 is a flowchart illustrating an image display process in the client of FIG. 10.

The processes of FIGS. 11 and 12 are repeated until the RTP packets are no longer transmitted from the server 12.

Next, referring to the flowchart in FIG. 14, the reception process in the reception control section 147 will be described.

This flowchart describes in detail the above-described processes of steps S34 and S35 of FIG. 11.

In step S61, the reception control section 147 determines whether or not the communication section 141 has received the frame information as a result of the process of step S33 of FIG. 11. When it is determined in step S61 that the frame information has been received, the process proceeds to step S62, where the reception control section 147 supplies the frame information received by the communication section 141 to the frame information holding section 150 of the image information holding section 148, where the frame information is held. The process then returns to step S61.

When it is determined in step S61 that the frame information has not been received, the process proceeds to step S63, where the reception control section 147 determines whether or not the communication section 141 has received the RTP packets. When it is determined in step S63 that the image data has not been received, since the data received by the communication section 141 is unnecessary data, the reception control section 147 does not perform the subsequent processes, and the process returns to step S61, where identical processing is repeated.

Furthermore, when the reception control section 147 determines in step S63 that the communication section 141 has received the image data, the process proceeds to step S64, where the timestamp of the RTP packet received by the communication section 141 is detected. That is, since the RTP packet is transmitted in the format shown in FIG. 8, the reception control section 147 detects the value of the timestamp described in the timestamp 118 of the header. This timestamp is initialized in the process of step S2 of FIG. 3, and is updated for each frame in step S14 of FIG. 4.

Figure 16:
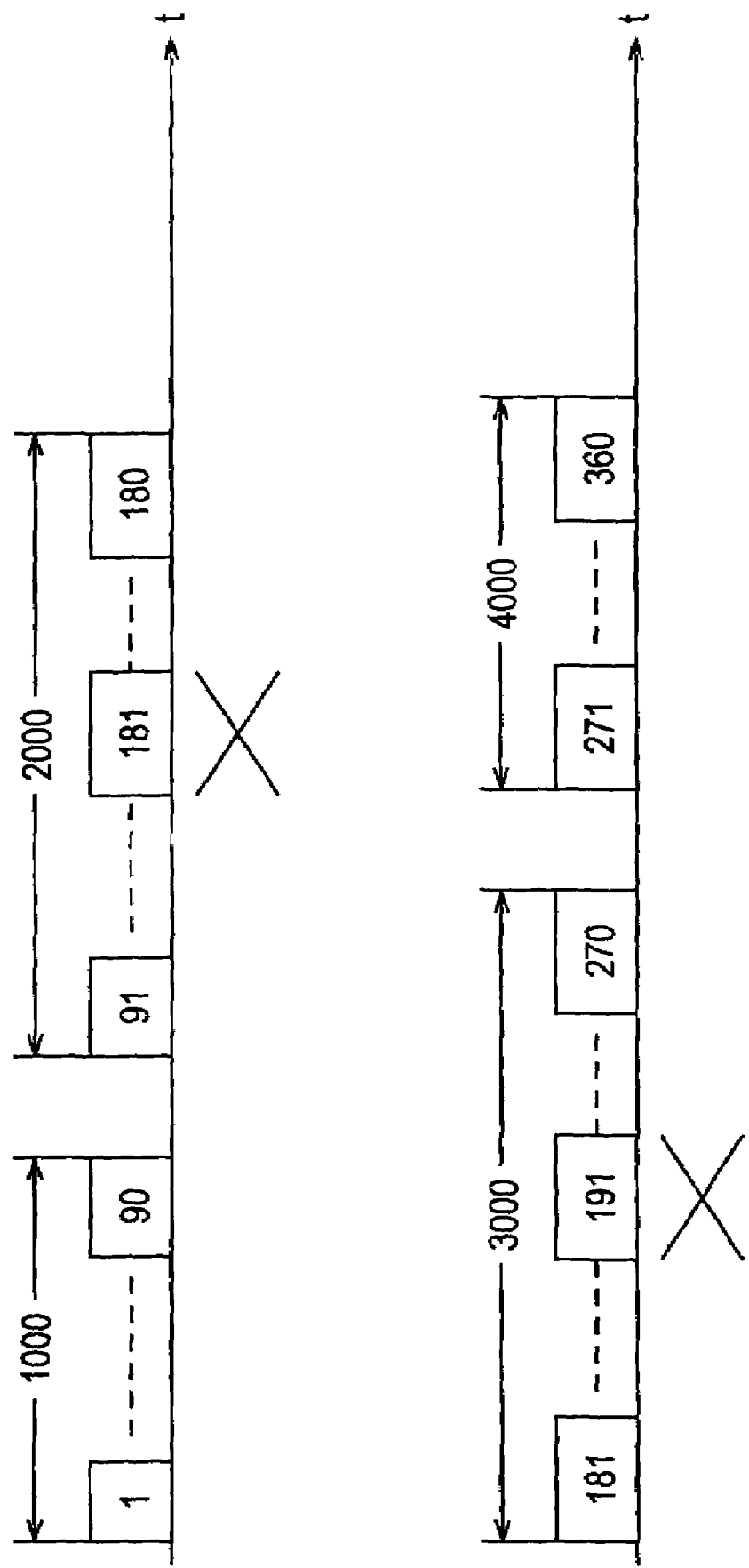
FIG. 16 shows an example of data to be received by the communication section of FIG. 10.

Here, FIG. 16 shows an example of RTP packets received by the communication section 141 by assuming that the horizontal axis indicates time t. In the case of this example, one frame is composed of 90 RTP packets. The communication section 141 receives a group of RTP packets (the RTP packets of the sequence numbers 1 to 90) of the image data of the frame whose timestamp is "1000", and thereafter receives a group of RTP packets (the RTP packets of the sequence numbers 91 to 180) of the image data of the frame whose timestamp is "2000". Then, the communication section 141 receives a group of RTP packets (the RTP packets of the sequence numbers 181 to 270) of the image data of the frame whose timestamp is "3000". Finally, the communication section 141 receives a group of RTP packets (the RTP packets of the sequence numbers 271 to 360) of the image data of the frame whose timestamp is "4000". In FIG. 16, the RTP packets of the sequence number 131 and the sequence number 191 are lost.

Referring back to FIG. 14, after the process of step S64, the process proceeds to step S65, where the reception control section 147 determines whether or not the timestamp detected in the previous process of step S64 exists. When it is determined in step S65 that the timestamp detected for the previous time exists, the process proceeds to step S66, where the reception control section 147 determines whether or not the timestamp detected in the process of step S64 for this time matches the timestamp detected for the previous time.

When it is determined in step S66 that the timestamp detected for this time does not match the previous timestamp, the process proceeds to step S67, where the reception control section 147 determines whether or not the timestamp detected for this time is greater than the previous timestamp. When it is determined in step S67 that the timestamp detected for this time is not greater than (smaller than) the previous timestamp, since the received image data has already been received and processed, the process returns to step S61.

Furthermore, when it is determined in step S67 that the timestamp detected for this time is greater than the previous timestamp, or when it is determined in step S65 that there is no previous timestamp, that is, when the RTP packet received by the communication section 141 is the first RTP packet of the frame, the process proceeds to step S68, where the reception control section 147 enters the timestamp detected for this time into the entry information storage section 149.

For example, in the communication section 141, in a case where the sequence of the RTP packets shown in FIG. 16 is received, when the RTP packet of the sequence number 1 is 5' received, since this RTP packet is the first packet in the frame, as shown in FIG. 17, entry information in which the timestamp "1000" is placed is entered (registered) into the entry information storage section 149. The entry information is composed of a timestamp 181, the amount of received data 182, and a flag 183. The flag 183 indicates whether or not a loss is detected (to be described later in the process of step S73). Furthermore, the amount of the received data 182 indicates the number of RTP packets within one received frame. When a new RTP packet within the one frame is received, the amount of the received data 182 is incremented (the process of step S70 to be described later).

Furthermore, in FIG. 16, when the RTP packet of the sequence number 91 is received, since the timestamp of the RTP packet is greater than the previous timestamp "1000" (the timestamp of the sequence number 90), a new timestamp "2000" is entered into the entry information storage section 149, and the entry information such as that shown in FIG. 18 is held in the entry information storage section 149.

In FIG. 18, since the image data whose received timestamp 181 is "1000" is composed of the RTP packets of the sequence numbers 1 to 90 and there is no loss, the amount of the received data 182 is "90", and the flag 183 is "0" indicating that there is no loss. Furthermore, since the RTP packet of the sequence number 91 is newly received, "2000" is entered into the timestamp 181.

Referring back to FIG. 15, after the process of step S68, the process proceeds to step S69, where the reception control section 147 determines whether or not some of the RTP packets are lost in accordance with the sequence number (the number described in the sequence 117 of the format of FIG. 8) of the RTP packet received by the communication section 141. That is, in step S69, when the sequence number of the RTP packet which is received for this time by the communication section 141 is the number next to the sequence number of the RTP packet received for the previous time, it is determined that the RTP packets are not lost, and when the sequence number is not the next number, it is determined that some of the RTP packets are lost (some of the RTP packets are lost due to a transmission error). When it is determined in step S69 that the RTP packets are not lost, the process proceeds to step S70, and when it is determined that some of the RTP packets are lost, the process proceeds to step S73.

Figure 14:
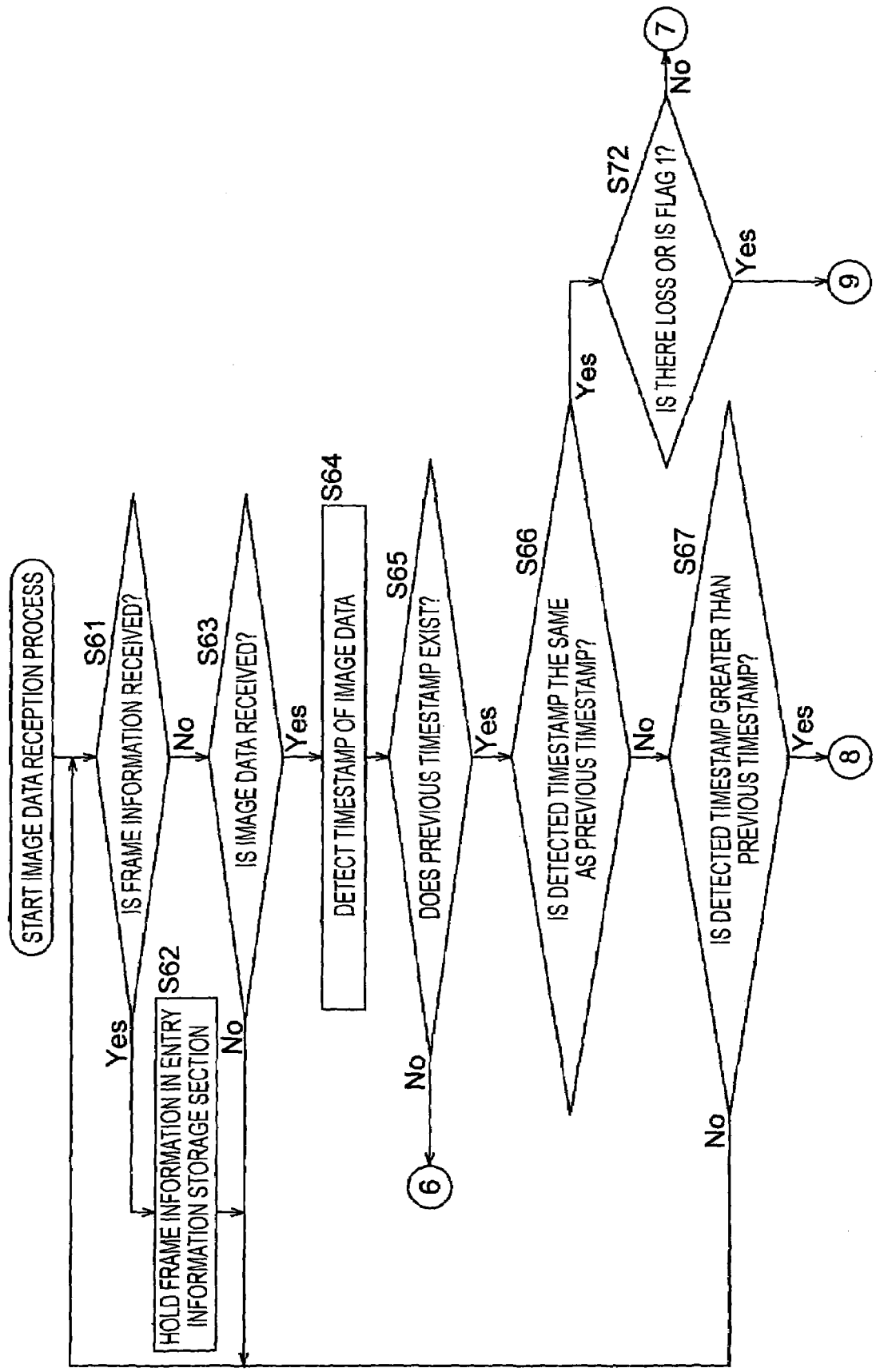
FIG. 14 is a flowchart illustrating an image data reception process in a reception control section of FIG. 10.

On the other hand, when it is determined in step S66 of FIG. 14 that the timestamp detected for this time matches the previous timestamp, the process proceeds to step S72, where the reception control section 147 determines whether or not some of the RTP packets are lost (the sequence numbers are not sequential numbers) or whether or not the flag 183 of the entry information storage section 149 is "1" (a loss is detected up to the previous time).

Figure 15:
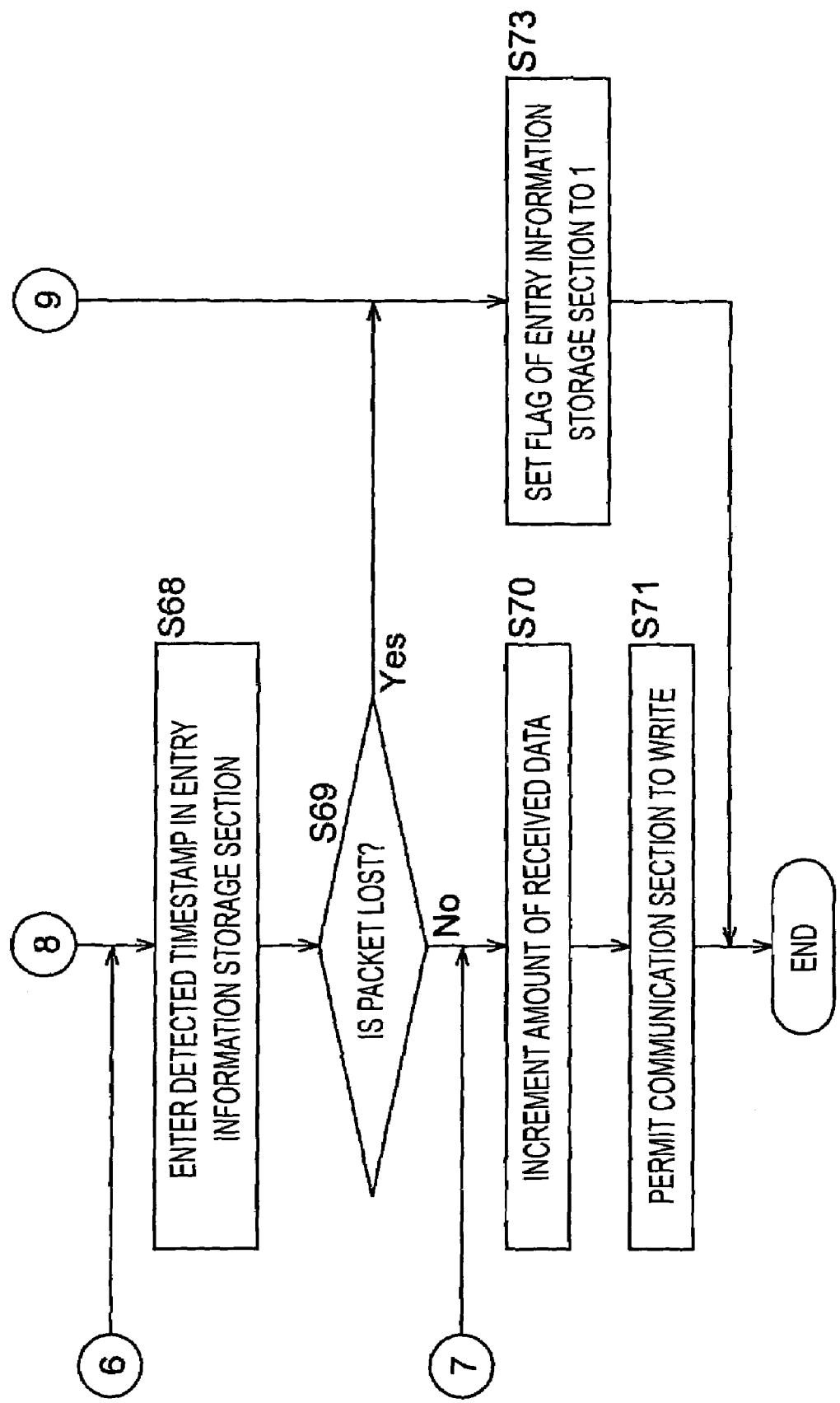
FIG. 15 is a flowchart illustrating the image data reception process in the reception control section of FIG. 10.

When a loss is not detected and it is determined that the flag 183 is not "1" (is "0") in the process of step S72, the process proceeds to step S70 of FIG. 15, where the reception control section 147 increments by 1 the amount of the received data 182 of the entry information storage section 149.

For example, when the RTP packet of the sequence number 91 is received, and as a result, the entry information shown in FIG. 18 is held in the entry information storage section 149 in the process of step S68, since there is no loss, the entry information shown in FIG. 19 is held in the entry information storage section 149. That is, the amount of the received data 182 whose timestamp 181 is "2000" is incremented from "0" to "1".

Furthermore, in the case of FIG. 16, when the RTP packets of the sequence numbers 1 to 94 are received normally, the amount of the received data 182 of the timestamp "2000" of the entry information storage section 149 is "4". Thereafter, when the sequence number 95 is received, the amount of received data 182 is incremented to "5".

Referring back to FIG. 15, after the process of step S70, the process proceeds to step S71, where the reception control section 147 permits the communication section 141 to write the RTP packets into the buffer 142, and the processing is terminated. Therefore, the communication section 141 performs the process of step S37 of FIG. 11 so as to write the received image data (RTP packets) into the buffer 142, and performs subsequent processes.

On the other hand, when it is determined in step S72 of FIG. 14 that some of the RTP packets are lost or the flag 183 is "1", the process proceeds to step S73, where the reception control section 147 sets the flag of the entry information storage section 149 to "1", and the processing is terminated. At this time, the reception control section 147 does not permit the communication section 141 to write the RTP packets into the buffer 142. Therefore, in this case, the communication section 141 does not write the RTP packets into the buffer 142.

For example, when the RTP packet of the sequence number 132 of the image data shown in FIG. 16 is received, since the RTP packet of the sequence number 132 is lost, in the entry information held in the entry information storage section 149, the flag 183 is changed from "0" to "1", as shown in FIG. 20. Since the RTP packet is not written into the buffer 142, the amount of the received data 182 is not changed.

Also, when the RTP packet of the sequence number 133 of the image data shown in FIG. 16 is received, since the flag is "1" (there is a lost RTP packet), the flag 183 of the entry information storage section 149 is kept at "1" and the RTP packet is not written into the buffer 142. Therefore, the amount of the received data 182 is not changed and kept at "40".

The above-described processing is performed for each packet until all the image data is received.

An example of entry information of the entry information storage section 149 when the image data shown in FIG. 16 is received by the communication section 141 is shown in FIG. 21.

In the case of this example, since the frame whose timestamp is "1000" is composed of 90 packets and there is no loss, the amount of the received data 182 whose timestamp 181 is "1000" is "90", and the flag 183 is "0". Furthermore, in the frame whose timestamp is "2000", since the RTP packet of the sequence number 131 is lost, only the RTP packets of the sequence numbers 91 to 130 are permitted to be written (processes of steps S70 and S71), and the amount of the received data whose timestamp 181 is "2000" is "40". At this time, since a loss of the RTP packet is detected, the flag 183 becomes "1".

Similarly, regarding the frame whose timestamp is "3000", since the RTP packet of the sequence number 191 is lost, only the RTP packets of the sequence numbers 181 to 190 are permitted to be written, the amount of the received data whose timestamp 181 is "3000" is "10", and the flag 183 becomes "1" because a loss is detected. In the frame whose timestamp is "4000", since there is no loss, all the RTP packets are written into the buffer 142, the amount of the received data is "90", and the flag 183 becomes "0".

As a result of the processes of FIGS. 14 and 15, the reception control section 147 writes only the image data received up to the time a loss has occurred (the image data with no loss) into the buffer 142.

In this manner, by detecting the sequence number, a loss can be detected. Furthermore, by discriminating the flag indicating the presence or absence of loss, only the image data received up to the time a loss is detected can be reliably held.

Figure 22:
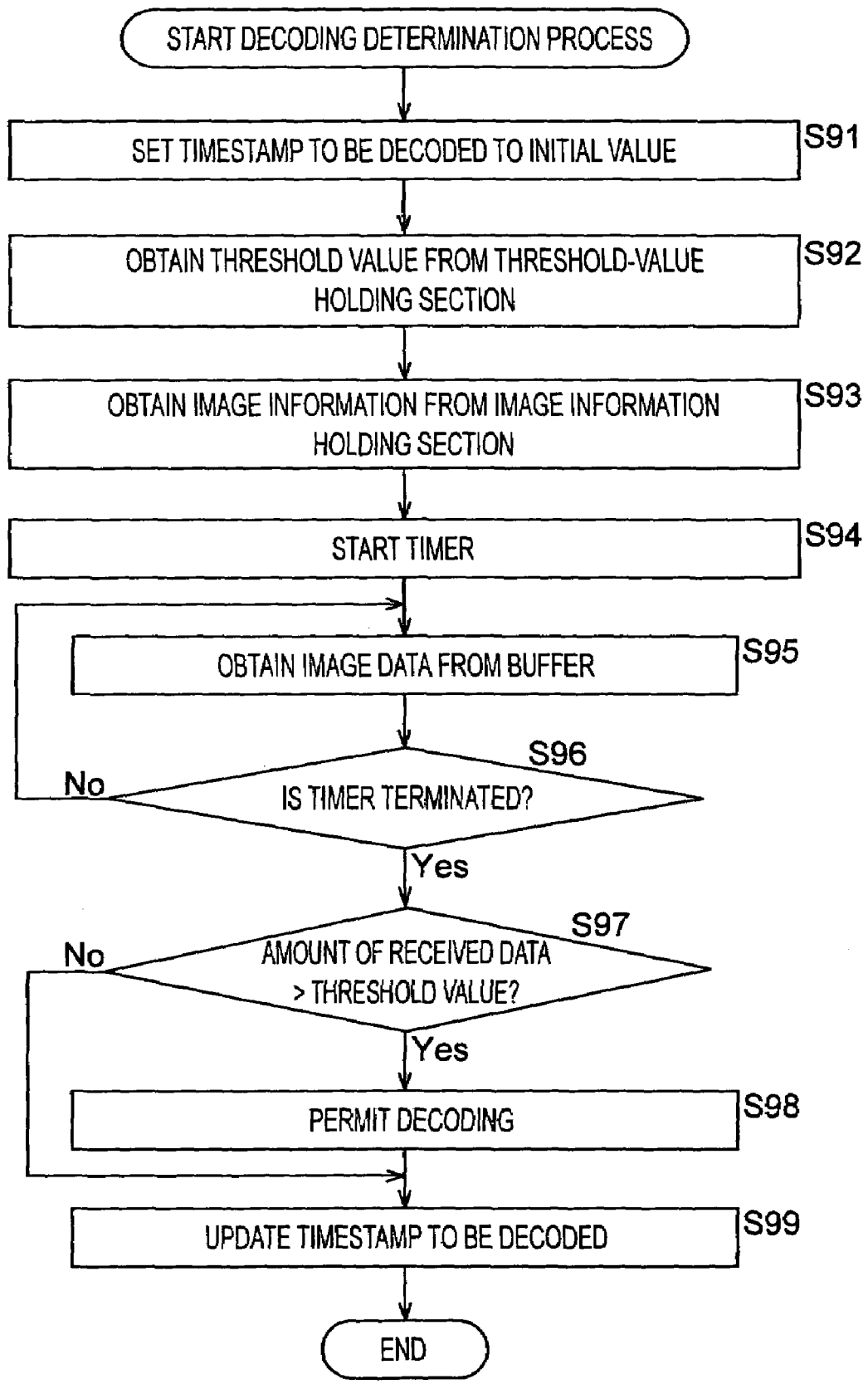
FIG. 22 is a flowchart illustrating a decoding determination process in a decoder control section of FIG. 10.

Next, referring to the flowchart in FIG. 22, a decoding determination process in the decoder control section 152 will be described. This flowchart describes in detail the above-described processes of steps 39 to S42 of FIG. 12.

In step S91, the decoder control section 152 sets the timestamp to be decoded, of the decoder 143 to an initial value ("1000" in this case), and the process proceeds to step S92. In step S92, the decoder control section 152 obtains, from the threshold-value holding section 151, the threshold value of the amount of data (the number of RTP packets) or the image quality, which is held in the process of step S32 of FIG. 11. The process then proceeds to step S93.

In step S93, the decoder control section 152 obtains image information from the image information holding section 148. That is, the decoder control section 152 obtains entry information (FIG. 21) from the entry information storage section 149, and obtains entry information (FIG. 5) from the frame information holding section 150.

After the process of step S93, the process proceeds to step S94, where the decoder control section 152 sets the timer (not shown) of the decoder 143 to a predetermined time (time required to obtain image data for one frame) so as to cause the timer to start, and the process proceeds to step S95. In step S95, the decoder control section 152 controls the decoder 143 in order to obtain image data from the buffer 142, and the process proceeds to step S96. In step S96, the decoder control section 152 determines whether or not the timer is terminated, and repeats the process of step S96 until the timer is terminated.

When the timer is terminated in the process of step S96 (the RTP packets for one frame are obtained), the decoder control section 152 proceeds from step S96 to step S97.

In step S97, it is determined whether or not the amount of the received data 182 obtained from the entry information storage section 149 (step S93) is greater than the threshold value obtained from the threshold-value holding section 151 (step S92).

When the threshold value held in the threshold-value holding section 151 indicates an image quality, the decoder control section 152 determines a threshold value for the number of packets on the basis of the relationship between the number of packets 52 and an image quality 53 of the frame information, which is held in the frame information holding section 150, in order to determine whether or not this threshold value is greater than the above threshold value.

In this manner, by transmitting the frame information from the server 12 to the client 13, even if the frame information is changed according to the image, the user needs only to determine the threshold value of the image quality in order to automatically determine the threshold value of the number of packets, making it possible to display an image with good image quality.

Referring back to FIG. 22, when it is determined in step S97 that the amount of the received data 182 is greater than the threshold value, the process proceeds to step S98, where the decoder control section 152 permits the decoder 143 to decode, and the process proceeds to step S99. Therefore, it is possible for the decoder 143 to decode the obtained image data and to display it on the display section 146 through the process of step S44 of FIG. 13.

On the other hand, when it is determined in step S97 that the amount of the received data 182 is less than or equal to the threshold value, the decoder control section 152 skips step S98, and the process proceeds to step S99. Therefore, the decoder 143 is not permitted to decode.

In step S99, the decoder control section 152 updates the timestamp to be decoded to the timestamp of the next frame ("2000" in this case).

The above-described processing is repeated for each frame until all the images are decoded.

For example, when the entry information shown in FIG. 21 is held in the entry information storage section 149 and the threshold value held in the threshold-value holding section 151 is "30", since the amounts of the received data 182 of the frames whose timestamps are "1000" and "2000 are "90" and "40", respectively, which are greater than the threshold value "30", decoding thereof is permitted. However, since the amount of the received data 182 of the frame whose timestamp is "3000" is "10", which is less than the threshold value "30", decoding thereof is not permitted. Furthermore, since the amount of the received data 182 of the frame whose timestamp is "4000" is "90", which is greater than the threshold value "30", decoding thereof is permitted. That is, the image data to be decoded is data whose timestamps are "1000", "2000", and "4000".

Therefore, when the image data whose timestamp is "3000" is to be displayed on the display section 146, as a result of the process of step S49 of FIG. 13, the image of the image data whose timestamp is "2000" (the image of the previous frame) is displayed.

In this manner, since decoding is controlled on the basis of the amount of received data, decoding of the image with a small amount of received data (having a poor image quality) is prohibited, and thus only the good-quality image can be displayed.

Although "bpp" is used for the unit of the image quality, any unit representing image quality, such as PSNR (per-square-noise-ratio), may be used.

The above-described series of processes can be performed by hardware and can also be performed by software.

Figure 23:
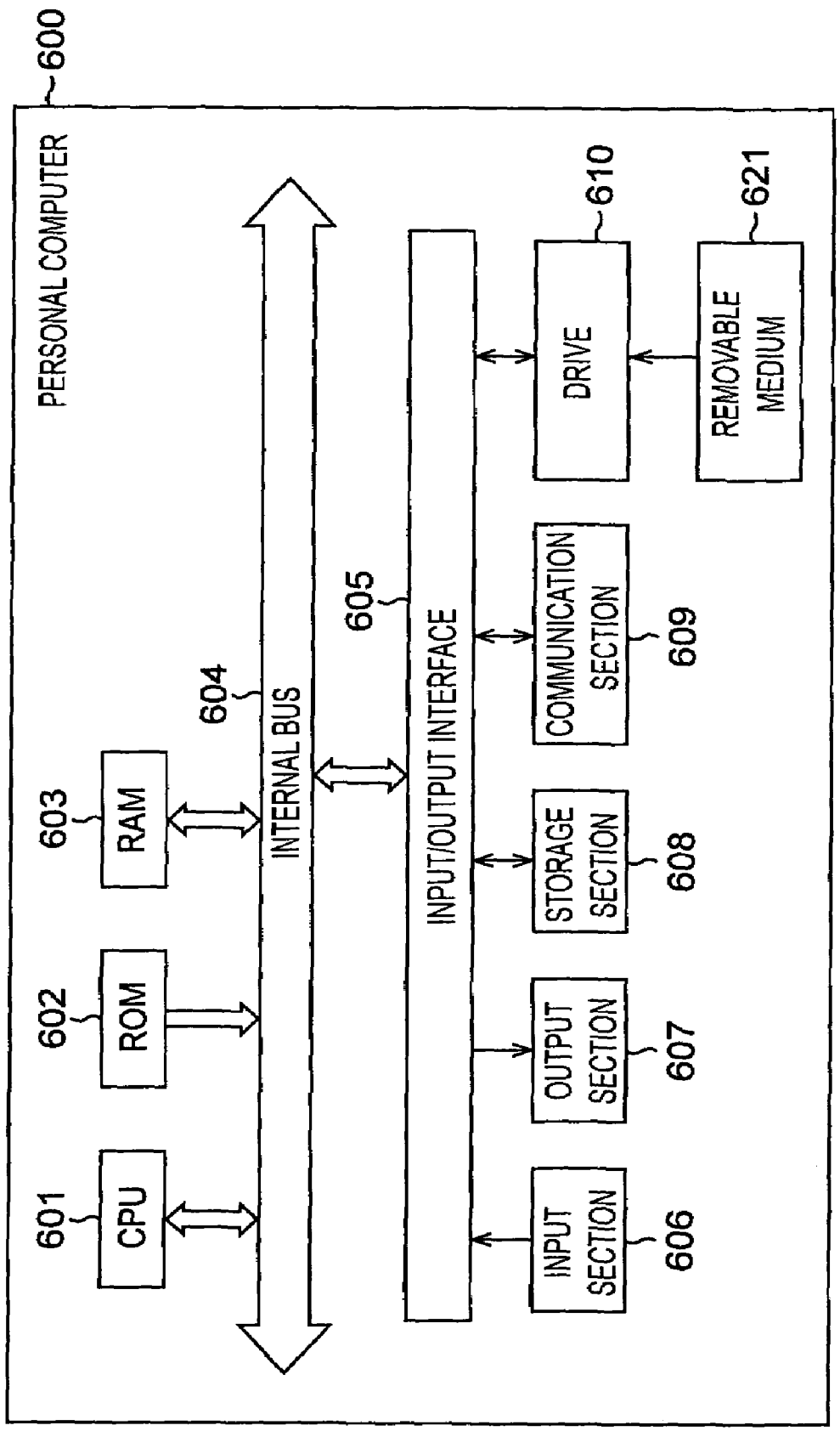
FIG. 23 is a block diagram showing an example of the configuration of a personal computer.

In this case, the above-described processes are performed by a personal computer 600 shown in FIG. 23.

In FIG. 23, a CPU (Central Processing Unit) 601 performs various kinds of processes in accordance with a program which is stored in a ROM (Read Only Memory) 602 or which is loaded from a storage section 608 into a RAM (Random Access Memory) 603. In the RAM 603, also, data required for the CPU 601 to perform various kinds of processes is stored as appropriate.

The CPU 601, the ROM 602, and the RAM 603 are interconnected with one another via an internal bus 604. An input/output interface 605 is further connected to the internal bus 604.

Connected to the input/output interface 605 are an input section 606 including a keyboard, a mouse, etc.; a display including a CRT, an LCD (Liquid-Crystal Display), etc.; an output section 607 including a speaker, etc.; a storage section 608 including a hard disk, etc.; and a communication section 609 including a modem, a terminal adapter, etc. The communication section 609 performs communication processing via various kinds of networks including a telephone line and a CATV.

A drive 610 is further connected to the input/output interface 605 as required. A removable medium 621 formed of a magnetic disk, an optical disk, a magneto-optical disk, or a semiconductor memory is loaded thereinto as appropriate, and a computer program read from the removable medium is installed into the storage section 608 as necessary.

When a series of processes is to be performed by software, a program forming the software is installed from a network or a recording medium into a computer incorporated into dedicated hardware or is installed into a general-purpose personal computer capable of executing various kinds of functions by installing various kinds of programs.

The recording medium is formed of a packaged medium composed of a removable medium 621 in which a program is recorded, the recording medium being distributed to provide a program to the user separately from the computer, as shown in FIG. 23. Furthermore, the recording medium includes the ROM 602, a hard disk having the storage section 608, and so on, in which a program is recorded, which are provided to the user by being preincorporated into the main unit of the apparatus.

In this specification, the steps describing the computer program include not only processes which are executed chronologically according to the described order, but also processes which are executed concurrently or individually, although these are not necessarily processed chronologically.

Furthermore, in this specification, the "system" represents the entire apparatus formed of a plurality of devices.

INDUSTRIAL APPLICABILITY

As has thus been described, according to a first aspect of the present invention, a system for receiving transmitted content can be realized. In particular, even when some content is lost during transmission, a good-quality image can be displayed.

According to a second aspect of the present invention, good-quality content can be displayed. In particular, even when some content is lost during transmission, a good-quality image can be displayed.

According to a third aspect of the present invention, good-quality content can be displayed. In particular, even when some content is lost during transmission, only the image with good image quality can be selected and displayed.

The invention claimed is:

1. A transmission and reception system comprising:
   a transmission apparatus configured to transmit content; and
   a reception apparatus configured to receive said content, said transmission apparatus comprises
      a coding section configured to code said content into hierarchy codes and output coded data of a plurality of layers,
      a packet generation section configured to generate packets including said coded data of the plurality of layers and a timestamp and output packets from low-level information of said coded data, and
      a transmission section configured to transmit said packets, and said reception apparatus comprises
      a reception section configured to receive said packets transmitted from said transmission apparatus,
      a holding section configured to hold said packets received by said reception section, a writing control section configured to control the writing of said packets received by said reception section into said holding section, and a determination section configured to determine whether there is packet loss in said packets transmitted from said transmission apparatus, and when there is packet loss within one frame of said content, said writing control section is further configured to write into the holding section said packets received up to a time said packet loss within one frame has occurred based on the timestamp in said packets, and not to write the remaining packets of said one frame into said holding section.

2. A transmission and reception system according to claim 1, further comprising:

a decoding control section configured to control the decoding of said coded data placed in said packets held in said holding section;

a decoding section configured to decode said coded data; and a threshold-value holding section configured to hold a threshold value with regard to the decoding of said decoding section, wherein said decoding control section is configured to control the decoding by said decoding section in accordance with said threshold value.

3. A transmission and reception system according to claim 2, wherein:

said transmission apparatus is configured to transmit frame information containing a number of packets of said coded data for each of said plurality of layers and information on an image quality of an image, which is obtained by decoding said coded data;

said reception section is further configured to receive said frame information; and said decoding control section is configured to control the decoding by said decoding section in accordance with said threshold value held in said threshold-value holding section and said frame information.

4. A transmission and reception method for use with a transmission and reception system comprising a transmission apparatus for transmitting content and a reception apparatus for receiving said content, the method comprising:

coding said content into hierarchy codes;

outputting coded data of a plurality of layers;

generating packets including said coded data of the plurality of layers;

outputting packets from low-level information of said coded data;

transmitting said packets from a transmission apparatus;

receiving said packets transmitted from said transmission apparatus;

controlling a writing of said packets received in the receiving step; and determining whether there is packet loss in said packets transmitted from said transmission apparatus, and when there is packet loss within one frame of said content, writing into the holding section said packets received up to a time the packet loss within said one frame has occurred based on the timestamp in said packets, and not writing the remaining packets of said one frame.

5. A transmission apparatus comprising:

an input section configured to receive frame information, a coding section configured to code said content into hierarchy codes and output coded data of a plurality of layers, a packet generation section configured to generate packets including said coded data of the plurality of layers and a timestamp and output packets in a plurality of layers with from low-level information of said coded data in packets in the lowest layer of said plurality of layers;

a holding section configured to hold said frame information containing a number of packets of said coded data for each of said plurality of layers and information on an image quality of an image, which is obtained by decoding said coded data; and a transmission section configured to transmit said packets and said frame information, wherein said coding section is configured to code said content into hierarchy codes in accordance with said frame information, and said packet generation section is configured to generate packets including said coded data of the plurality of layers and the timestamp in accordance with said frame information.

6. A transmission method comprising:

receiving frame information;

coding content into hierarchy codes;

outputting coded data of a plurality of layers;

generating packets including said coded data of the plurality of layers and a timestamp;

outputting packets in a plurality of layers with from low-level information of said coded data in packets in the lowest layer of said plurality of layers;

holding said frame information containing a number of packets of said coded data for each of said plurality of layers and information on an image quality of an image, which is obtained by decoding said coded data; and transmitting said packets and said frame information, said content is coded into hierarchy codes in accordance with said frame information, and said generating includes generating packets including said coded data of the plurality of layers and the timestamp in accordance with said frame information.

7. A computer-readable medium storing a computer program that, when executed on a computer, causes the computer to perform steps comprising:

receiving frame information;

coding content into hierarchy codes;

outputting coded data of a plurality of layers;

generating packets including said coded data of the plurality of layers;

outputting packets in a plurality of layers with from low-level information of said coded data in packets in the lowest layer of said plurality of layers; and transmitting frame information containing a number of packets of said coded data for each of said plurality of layers and information on an image quality of an image, which is obtained by decoding said coded data, said coding includes coding content into hierarchy codes in accordance with said frame information, and said generating includes generating packets including said coded data of the plurality of layers and the timestamp in accordance with said frame information.

8. A reception apparatus configured to receive packets transmitted from a transmission apparatus, said packets including a timestamp and coded data of a plurality of layers, which is obtained by performing hierarchy coding on content, comprising:

a receiving section configured to receive said packets transmitted from said transmission apparatus;

a holding section configured to hold said packets received by said receiving section;

a writing control section configured to control the writing of said packets received by said receiving section into said holding section; and a determination section configured to determine whether there is packet loss in said packets transmitted from said transmission apparatus, and when there is packet loss within one frame of said content, said writing control section is further configured to write into the holding section said packets received up to a time said packet loss within one frame has occurred based on the timestamp in said packets, and not to write the remaining packets of said one frame into said holding section.

9. A reception apparatus according to claim 8, further comprising:

a decoding control section configured to control the decoding of said coded data placed in said packets held in said holding section;

a decoding section configured to decode said coded data; and a threshold-value holding section configured to hold a threshold value with regard to the decoding of said decoding section, wherein said decoding control section is further configured to control decoding by said decoding section in accordance with said threshold value.

10. A reception apparatus according to claim 9, wherein:

said transmission apparatus is further configured to transmit frame information containing a number of packets of said coded data for each of said plurality of layers and information on an image quality of an image, which is obtained by decoding said coded data;

said receiving section is further configured to receive said frame information; and said decoding control section is configured to control decoding by said decoding section in accordance with said threshold value held in said threshold-value holding section and said frame information.

11. A reception apparatus according to claim 9, further comprising:

a storage section configured to store said content decoded by said decoding section;

a display control section configured to control a display of said content; and a display section configured to display said content, wherein, when the decoding of said coded data is not permitted by said decoding control section, said display control section makes the display section display said content that is stored in said storage section earlier than content corresponding to the coded data.

12. A reception method for use with a reception apparatus for receiving packets transmitted from a transmission apparatus that transmits said packets that include a timestamp and coded data of a plurality of layers, which is obtained by performing hierarchy coding on content, said reception method comprising:

receiving said packets transmitted from said transmission apparatus;

controlling a writing of said packets received in the receiving step; and determining whether there is packet loss in said packets transmitted from said transmission apparatus, and when there is packet loss within one frame of said content, writing into a holding section said packets received up to a time said packet loss within one frame has occurred, the time based on the timestamp in said packets, and not writing the remaining packets of said one frame.

13. A computer-readable medium storing a computer program that, when executed on a computer, causes the computer to receive packets transmitted from a transmission apparatus, said packets including a timestamp and coded data of a plurality of layers, which is obtained by performing hierarchy coding on content, said computer performing steps comprising:

receiving said packets transmitted from said transmission apparatus;

controlling a writing of said packets received in the receiving step; and determining whether there is packet loss in said packets transmitted from said transmission apparatus, and when there is packet loss within one frame of said content, writing into a holding section said packets received up to a time said packet loss within one frame has occurred, the time based on the timestamp in said packets, and not writing the remaining packets of said one frame.

* * * * *